United States Patent
Igarashi

(10) Patent No.: US 11,816,327 B2
(45) Date of Patent: Nov. 14, 2023

(54) DISPLAY APPARATUS, METHOD FOR DISPLAYING, AND NON-TRANSITORY RECORDING MEDIUM

(71) Applicant: Kanae Igarashi, Kanagawa (JP)

(72) Inventor: Kanae Igarashi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 34 days.

(21) Appl. No.: 17/582,023

(22) Filed: Jan. 24, 2022

(65) Prior Publication Data

US 2022/0283701 A1    Sep. 8, 2022

(30) Foreign Application Priority Data

Mar. 3, 2021    (JP) .................... 2021-033451

(51) Int. Cl.
*G06F 3/04883*    (2022.01)
*G06V 10/22*    (2022.01)
*G06V 30/142*    (2022.01)

(52) U.S. Cl.
CPC ........ *G06F 3/04883* (2013.01); *G06V 10/235* (2022.01); *G06V 30/1423* (2022.01)

(58) Field of Classification Search
None
See application file for complete search history.

(56) References Cited

U.S. PATENT DOCUMENTS

| | | | |
|---|---|---|---|
| 2011/0078560 A1* | 3/2011 | Weeldreyer | G06F 3/0488 715/255 |
| 2012/0013539 A1* | 1/2012 | Hogan | G06F 3/04883 345/173 |
| 2012/0013540 A1* | 1/2012 | Hogan | G06F 40/177 345/173 |
| 2012/0173963 A1* | 7/2012 | Hoke | G06F 40/18 715/234 |
| 2017/0039167 A1* | 2/2017 | Walker | G06F 3/0482 |
| 2017/0293826 A1 | 10/2017 | Kemmochi et al. | |

FOREIGN PATENT DOCUMENTS

| | | |
|---|---|---|
| JP | 2012-181708 | 9/2012 |
| JP | 2015-219628 | 12/2015 |
| JP | 2016-134014 | 7/2016 |

* cited by examiner

*Primary Examiner* — Nicholas J Lee
(74) *Attorney, Agent, or Firm* — XSENSUS LLP

(57) ABSTRACT

A display apparatus includes circuitry that displays, on a screen, a table including one or more table elements; receives handwritten data input on the screen by a user operation; and selects, based on the handwritten data, at least one table element of the table. The table element is a row or a column of the table.

14 Claims, 43 Drawing Sheets

| DRAWING OBJECT ID | ROW OBJECT ID | START POINT COORDINATES | END POINT COORDINATES | OBJECT TYPE |
|---|---|---|---|---|
| 001 | 001 | (Sx1, Sy1) | (Ex1, Ey1) | TABLE (ROW) |
| 001 | 002 | (Sx2, Sy2) | (Ex2, Ey2) | TABLE (ROW) |
| 001 | ... | ... | ... | TABLE (ROW) |
| 001 | 00m | (Sxm, Sym) | (Exm, Eym) | TABLE (ROW) |
| 001 | ... | ... | ... | TABLE (ROW) |
| 001 | 00n | (Sxn, Syn) | (Exn, Eyn) | TABLE (ROW) |
| 002 | – | (Sxp, Syp) | (Exp, Eyp) | HANDWRITING |

FIG. 7

| ROW OBJECT ID | START POINT COORDINATES | END POINT COORDINATES |
|---|---|---|
| 001 | (Sx1, Sy1) | (Ex1, Ey1) |
| 002 | (Sx2, Sy2) | (Ex2, Ey2) |
| ... | ... | ... |
| 00m | (Sxm, Sym) | (Exm, Eym) |
| ... | ... | ... |
| 00n | (Sxn, Syn) | (Exn, Eyn) |

| ROW OBJECT ID | START POINT COORDINATES | END POINT COORDINATES |
|---|---|---|
| 001 | (Sx1, Sy1) | (Ex1, Ey1) |
| 002 | (Sx2, Sy2) | (Ex2, Ey2) |
| ... | ... | ... |
| 00m | (Sxm, Sym) | (Exm, Eym) |
| ... | ... | ... |
| 00n | (Sxn, Syn) | (Exn, Eyn) |
| 00(n+1) | (Sx(n+1), Sy(n+1)) | (Ex(n+1), Ey(n+1)) |

FIG. 13A

| ROW OBJECT ID | START POINT COORDINATES | END POINT COORDINATES |
|---|---|---|
| 001 | (Sx1, Sy1) | (Ex1, Ey1) |
| 002 | (Sx2, Sy2) | (Ex2, Ey2) |
| ... | ... | ... |
| 00m | (Sxm, Sym) | (Exm, Eym) |
| ... | ... | ... |
| 00n | (Sxn, Syn) | (Exn, Eyn) |

| DRAWING OBJECT ID | ROW OBJECT ID | START POINT COORDINATES | END POINT COORDINATES | OBJECT TYPE |
|---|---|---|---|---|
| 001 | 001 | (Sx1, Sy1) | (Ex1, Ey1) | TABLE (ROW) |
| 001 | 002 | (Sx2, Sy2) | (Ex2, Ey2) | TABLE (ROW) |
| 001 | ... | ... | ... | TABLE (ROW) |
| 001 | 00m | (Sxm, Sym) | (Exm, Eym) | TABLE (ROW) |
| 001 | ... | ... | ... | TABLE (ROW) |
| 001 | 00n | (Sxn, Syn) | (Exn, Eyn) | TABLE (ROW) |
| 002 | - | (Sxp, Syp) | (Exp, Eyp) | HANDWRITING |

FIG. 17B

| DRAWING OBJECT ID | ROW OBJECT ID | START POINT COORDINATES | END POINT COORDINATES | OBJECT TYPE |
|---|---|---|---|---|
| 001 | 001 | (Sx1, Sy1) | (Ex1, Ey1) | TABLE (ROW) |
| 001 | 002 | (Sx2, Sy2) | (Ex2, Ey2) | TABLE (ROW) |
| 001 | ... | ... | ... | TABLE (ROW) |
| 001 | 00m | (Sxm, Sym) | (Exm, Eym) | TABLE (ROW) |
| 001 | ... | ... | ... | TABLE (ROW) |
| 001 | 00n | (Sxn, Syn) | (Exn, Eyn) | TABLE (ROW) |
| 001 | 00(n+1) | (Sx(n+1), Sy(n+1)) | (Ex(n+1), Ey(n+1)) | TABLE (ROW) |

FIG. 20A

| DRAWING OBJECT ID | ROW OBJECT ID | START POINT COORDINATES | END POINT COORDINATES | OBJECT TYPE |
|---|---|---|---|---|
| 001 | 001 | $(S_{x1}, S_{y1})$ | $(E_{x1}, E_{y1})$ | TABLE (ROW) |
| 001 | 002 | $(S_{x2}, S_{y2})$ | $(E_{x2}, E_{y2})$ | TABLE (ROW) |
| 001 | ... | ... | ... | TABLE (ROW) |
| 001 | 00m | $(S_{xm}, S_{ym})$ | $(E_{xm}, E_{ym})$ | TABLE (ROW) |
| 001 | ... | ... | ... | TABLE (ROW) |
| 001 | 00n | $(S_{xn}, S_{yn})$ | $(E_{xn}, E_{yn})$ | TABLE (ROW) |
| 002 | – | $(S_{xp}, S_{yp})$ | $(E_{xp}, E_{yp})$ | HANDWRITING |

FIG. 20B

| DRAWING OBJECT ID | ROW OBJECT ID | START POINT COORDINATES | END POINT COORDINATES | OBJECT TYPE |
|---|---|---|---|---|
| 001 | 001 | $(S_{x1}, S_{y1})$ | $(E_{x1}, E_{y1})$ | TABLE (ROW) |
| 001 | 002 | $(S_{x2}, S_{y2})$ | $(E_{x2}, E_{y2})$ | TABLE (ROW) |
| 001 | ... | ... | ... | TABLE (ROW) |
| 001 | 00m | $(S_{xm}, S_{ym})$ | $(E_{xm}, E_{ym})$ | TABLE (ROW) |
| 001 | ... | ... | ... | TABLE (ROW) |
| 001 | 00n | $(S_{xn}, S_{yn})$ | $(E_{xn}, E_{yn})$ | TABLE (ROW) |
| 001 | 00(n+1) | $(S_{x(n+1)}, S_{y(n+1)})$ | $(E_{x(n+1)}, E_{y(n+1)})$ | TABLE (ROW) |

FIG. 23A

| ROW OBJECT ID | START POINT COORDINATES | END POINT COORDINATES |
|---|---|---|
| 001 | (Sx1, Sy1) | (Ex1, Ey1) |
| 002 | (Sx2, Sy2) | (Ex2, Ey2) |
| ... | ... | ... |
| ~~00m~~ | ~~(Sxm, Sym)~~ | ~~(Exm, Eym)~~ |
| ... | ... | ... |
| 00(n−1) | (Sx(n−1), Sy(n−1)) | (Ex(n−1), Ey(n−1)) |
| 00n | (Sxn, Syn) | (Exn, Eyn) |

FIG. 23B

| ROW OBJECT ID | START POINT COORDINATES | END POINT COORDINATES |
|---|---|---|
| 001 | (Sx1, Sy1) | (Ex1, Ey1) |
| 002 | (Sx2, Sy2) | (Ex2, Ey2) |
| ... | ... | ... |
| 00m | (Sxm, Sym) | (Exm, Eym) |
| ... | ... | ... |
| 00(n−1) | (Sx(n−1), Sy(n−1)) | (Ex(n−1), Ey(n−1)) |

| DRAWING OBJECT ID | ROW OBJECT ID | START POINT COORDINATES | END POINT COORDINATES | OBJECT TYPE |
|---|---|---|---|---|
| 001 | 001 | (Sx1, Sy1) | (Ex1, Ey1) | TABLE (ROW) |
| 001 | 002 | (Sx2, Sy2) | (Ex2, Ey2) | TABLE (ROW) |
| 001 | ... | ... | ... | TABLE (ROW) |
| ~~001~~ | ~~00m~~ | ~~(Sxm, Sym)~~ | ~~(Exm, Eym)~~ | ~~TABLE (ROW)~~ |
| 001 | ... | ... | ... | TABLE (ROW) |
| 001 | 00n | (Sxn, Syn) | (Exn, Eyn) | TABLE (ROW) |
| 002 | - | (Sxp, Syp) | (Exp, Eyp) | HANDWRITING |

FIG. 26B

| DRAWING OBJECT ID | ROW OBJECT ID | START POINT COORDINATES | END POINT COORDINATES | OBJECT TYPE |
|---|---|---|---|---|
| 001 | 001 | (Sx1, Sy1) | (Ex1, Ey1) | TABLE (ROW) |
| 001 | 002 | (Sx2, Sy2) | (Ex2, Ey2) | TABLE (ROW) |
| 001 | ... | ... | ... | TABLE (ROW) |
| 001 | 00m | (Sxm, Sym) | (Exm, Eym) | TABLE (ROW) |
| 001 | ... | ... | ... | TABLE (ROW) |
| 001 | 00(n-1) | (Sx(n-1), Sy(n-1)) | (Ex(n-1), Ey(n-1)) | TABLE (ROW) |

| DRAWING OBJECT ID | ROW OBJECT ID | START POINT COORDINATES | END POINT COORDINATES | OBJECT TYPE |
|---|---|---|---|---|
| 001 | 001 | (Sx1, Sy1) | (Ex1, Ey1) | TABLE (ROW) |
| 001 | 002 | (Sx2, Sy2) | (Ex2, Ey2) | TABLE (ROW) |
| 001 | ... | ... | ... | TABLE (ROW) |
| ~~001~~ | ~~00m~~ | ~~(Sxm, Sym)~~ | ~~(Exm, Eym)~~ | ~~TABLE (ROW)~~ |
| 001 | ... | ... | ... | TABLE (ROW) |
| 001 | 00n | (Sxn, Syn) | (Exn, Eyn) | TABLE (ROW) |
| 002 | – | (Sxp, Syp) | (Exp, Eyp) | HANDWRITING |

FIG. 29B

| DRAWING OBJECT ID | ROW OBJECT ID | START POINT COORDINATES | END POINT COORDINATES | OBJECT TYPE |
|---|---|---|---|---|
| 001 | 001 | (Sx1, Sy1) | (Ex1, Ey1) | TABLE (ROW) |
| 001 | 002 | (Sx2, Sy2) | (Ex2, Ey2) | TABLE (ROW) |
| 001 | ... | ... | ... | TABLE (ROW) |
| 001 | 00m | (Sxm, Sym) | (Exm, Eym) | TABLE (ROW) |
| 001 | ... | ... | ... | TABLE (ROW) |
| 001 | 00(n−1) | (Sx(n−1), Sy(n−1)) | (Ex(n−1), Ey(n−1)) | TABLE (ROW) |

FIG. 32A

| ROW OBJECT ID | START POINT COORDINATES | END POINT COORDINATES | TEXT |
|---|---|---|---|
| 001 | (Sx1, Sy1) | (Ex1, Ey1) | T1 |
| 002 | (Sx2, Sy2) | (Ex2, Ey2) | T2 |
| ... | ... | ... | ... |
| 00m | (Sxm, Sym) | (Exm, Eym) | Tm |
| ... | ... | ... | ... |
| 00n | (Sxn, Syn) | (Exn, Eyn) | Tn |

FIG. 32B

| ROW OBJECT ID | START POINT COORDINATES | END POINT COORDINATES | TEXT |
|---|---|---|---|
| 001 | (Sx1, Sy1) | (Ex1, Ey1) | Tm |
| 002 | (Sx2, Sy2) | (Ex2, Ey2) | T1 |
| ... | ... | ... | ... |
| 00m | (Sxm, Sym) | (Exm, Eym) | T(m−1) |
| ... | ... | ... | ... |
| 00n | (Sxn, Syn) | (Exn, Eyn) | Tn |

FIG. 35A

| DRAWING OBJECT ID | ROW OBJECT ID | START POINT COORDINATES | END POINT COORDINATES | OBJECT TYPE | TEXT |
|---|---|---|---|---|---|
| 001 | 001 | (Sx1, Sy1) | (Ex1, Ey1) | TABLE (ROW) | T1 |
| 001 | 002 | (Sx2, Sy2) | (Ex2, Ey2) | TABLE (ROW) | T2 |
| 001 | ... | ... | ... | TABLE (ROW) | ... |
| 001 | 00m | (Sxm, Sym) | (Exm, Eym) | TABLE (ROW) | Tm |
| 001 | ... | ... | ... | TABLE (ROW) | ... |
| 001 | 00n | (Sxn, Syn) | (Exn, Eyn) | TABLE (ROW) | Tn |
| 002 | - | (Sxp, Syp) | (Exp, Eyp) | HANDWRITING | - |

FIG. 35B

| DRAWING OBJECT ID | ROW OBJECT ID | START POINT COORDINATES | END POINT COORDINATES | OBJECT TYPE | TEXT |
|---|---|---|---|---|---|
| 001 | 001 | (Sx1, Sy1) | (Ex1, Ey1) | TABLE (ROW) | Tm |
| 001 | 002 | (Sx2, Sy2) | (Ex2, Ey2) | TABLE (ROW) | T1 |
| 001 | ... | ... | ... | TABLE (ROW) | ... |
| 001 | 00m | (Sxm, Sym) | (Exm, Eym) | TABLE (ROW) | T(m−1) |
| 001 | ... | ... | ... | TABLE (ROW) | ... |
| 001 | 00n | (Sxn, Syn) | (Exn, Eyn) | TABLE (ROW) | Tn |

FIG. 38A

| DRAWING OBJECT ID | ROW OBJECT ID | START POINT COORDINATES | END POINT COORDINATES | OBJECT TYPE | TEXT |
|---|---|---|---|---|---|
| 001 | 001 | (Sx1, Sy1) | (Ex1, Ey1) | TABLE (ROW) | T1 |
| 001 | 002 | (Sx2, Sy2) | (Ex2, Ey2) | TABLE (ROW) | T2 |
| 001 | ... | ... | ... | TABLE (ROW) | ... |
| 001 | 00m | (Sxm, Sym) | (Exm, Eym) | TABLE (ROW) | Tm |
| 001 | ... | ... | ... | TABLE (ROW) | ... |
| 001 | 00n | (Sxn, Syn) | (Exn, Eyn) | TABLE (ROW) | Tn |
| 002 | - | (Sxp, Syp) | (Exp, Eyp) | HANDWRITING | - |

FIG. 38B

| DRAWING OBJECT ID | ROW OBJECT ID | START POINT COORDINATES | END POINT COORDINATES | OBJECT TYPE | TEXT |
|---|---|---|---|---|---|
| 001 | 001 | (Sx1, Sy1) | (Ex1, Ey1) | TABLE (ROW) | Tm |
| 001 | 002 | (Sx2, Sy2) | (Ex2, Ey2) | TABLE (ROW) | T1 |
| 001 | ... | ... | ... | TABLE (ROW) | ... |
| 001 | 00m | (Sxm, Sym) | (Exm, Eym) | TABLE (ROW) | T(m-1) |
| 001 | ... | ... | ... | TABLE (ROW) | ... |
| 001 | 00n | (Sxn, Syn) | (Exn, Eyn) | TABLE (ROW) | Tn |

| DRAWING OBJECT ID | ROW OBJECT ID | START POINT COORDINATES | END POINT COORDINATES | OBJECT TYPE |
|---|---|---|---|---|
| 001 | 001 | (Sx1, Sy1) | (Ex1, Ey1) | TABLE (ROW) |
| 001 | 002 | (Sx2, Sy2) | (Ex2, Ey2) | TABLE (ROW) |
| 001 | ... | ... | ... | TABLE (ROW) |
| 001 | 00m | (Sxm, Sym) | (Exm, Eym) | TABLE (ROW) |
| 001 | ... | ... | ... | TABLE (ROW) |
| 001 | 00(n-1) | (Sx(n-1), Sy(n-1)) | (Ex(n-1), Ey(n-1)) | TABLE (ROW) |
| 001 | 00n | (Sxn, Syn) | (Exn, Eyn) | TABLE (ROW) |

FIG. 41B

| DRAWING OBJECT ID | ROW OBJECT ID | START POINT COORDINATES | END POINT COORDINATES | OBJECT TYPE |
|---|---|---|---|---|
| 001 | 001 | (Sx1, Sy1) | (Ex1, Ey1) | TABLE (ROW) |
| 001 | 002 | (Sx2, Sy2) | (Ex2, Ey2) | TABLE (ROW) |
| 001 | ... | ... | ... | TABLE (ROW) |
| 001 | 00m | (Sxm, Sym) | (Exm, Eym) | TABLE (ROW) |
| 001 | ... | ... | ... | TABLE (ROW) |
| 001 | 00(n-1) | (Sx(n-1), Sy(n-1)) | (Ex(n-1), Ey(n-1)) | TABLE (ROW) |
| 002 | 001 | (Sx21, Sy21) | (Ex21, Ey21) | TABLE (ROW) |

DISPLAY APPARATUS, METHOD FOR DISPLAYING, AND NON-TRANSITORY RECORDING MEDIUM

CROSS-REFERENCE TO RELATED APPLICATION

This patent application is based on and claims priority pursuant to 35 U.S.C. § 119(a) to Japanese Patent Application No. 2021-033451, filed on Mar. 3, 2021, in the Japan Patent Office, the entire disclosure of which is hereby incorporated by reference herein.

BACKGROUND

Technical Field

Embodiments of the present disclosure relate to a display apparatus, a method for displaying, and a non-transitory recording medium.

Related Art

There are known display apparatuses that convert handwriting input into a text and displays the text on a screen by using a handwriting recognition technique. A display apparatus having a relatively large touch panel is used in a conference room or the like, and is shared by a plurality of users as an electronic whiteboard or the like.

A related-art display apparatus receives an input of a table based on handwritten data.

SUMMARY

An embodiment of the present disclosure provides a display apparatus includes circuitry that displays, on a screen, a table including one or more table elements; receives handwritten data input on the screen by a user operation; and selects, based on the handwritten data, at least one table element of the table. The table element is a row or a column of the table.

Another embodiment provides a method for displaying on a screen. The method includes displaying, on a screen, a table including one or more table elements, the table element being a row or a column of the table; receiving handwritten data input on the screen by a user operation; and selecting, based on the handwritten data, at least one table element of the table.

Another embodiment provides a non-transitory recording medium storing a plurality of program codes which, when executed by one or more processors, causes the processors to perform the method described above.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 2A and 2B are diagrams illustrating an example of a method for selecting a row in a table according to one embodiment;

FIG. 6 schematically illustrates drawing object information stored by a drawing object management unit according to one embodiment;

FIG. 7 schematically illustrates an example of row object information;

FIGS. 12A and 12B are diagrams illustrating an example of a table in which buttons are displayed;

FIGS. 13A and 13B illustrate examples of table object information before and after addition of a row;

FIGS. 15A, 15B, and 15C are diagram illustrating an example of a method for adding a row to a table using handwritten data on a display, according to one embodiment;

FIGS. 17A and 17B are tables illustrating examples of drawing object information before and after addition of a row;

FIGS. 20A and 20B are tables illustrating examples of drawing object information before and after addition of a row;

FIGS. 23A and 23B are diagrams illustrating examples of table object information before and after deletion of a row;

FIGS. 24A and 24B are diagram illustrating another example of a method for deleting a row from a table based on handwritten data according to one embodiment;

FIGS. 26A and 26B are diagrams an example of illustrating drawing object information before and after deletion of a row;

FIGS. 27A and 27B are diagram illustrating another example of the method for deleting a row from a table based on handwritten data according to one embodiment;

FIGS. 29A and 29B are diagrams illustrating an example of drawing object information before and after deletion of a row;

FIGS. 32A and 32B are tables illustrating an example of table object information before and after moving a row;

FIGS. 35A and 35B are tables illustrating examples of drawing object information before and after moving a row;

FIGS. 38A and 38B are tables illustrating examples of drawing object information before and after moving a row;

FIGS. 39A to 39C are diagrams illustrating an example of a method for dividing a table on the display apparatus according to one embodiment;

FIGS. 41A and 41B are diagrams illustrating examples of drawing object information before and after dividing a table;

Figure 1B:
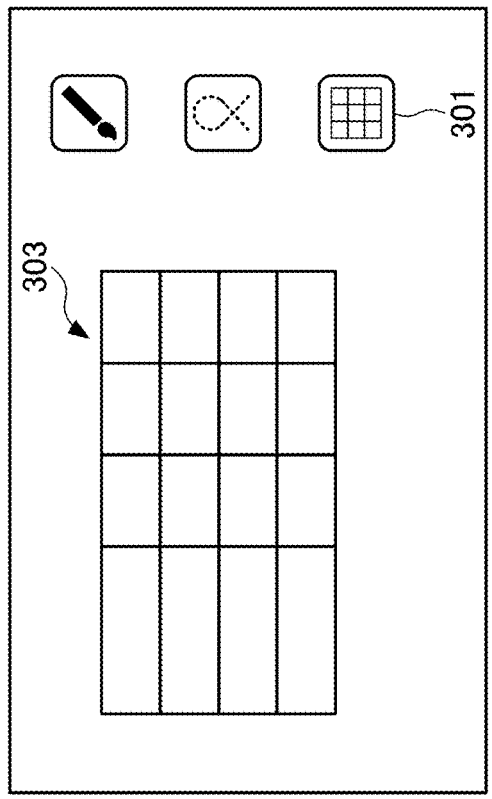
FIGS. 1A and 1B are diagrams illustrating an example of operation in which a display apparatus receives an input of a handwritten table according to one embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A description is given of a comparative example of a display apparatus for assisting a user to edit a table on a display before describing a display apparatus for assisting a user to edit according to the present embodiment. Note that the comparative example is not necessarily a background art.

It is assumed that a user edits a table on a display with an electronic pen or the like, by operating a certain menu. For example, the following operation is performed. To insert a new row, the user selects a row under or above which the new row is to be inserted and causes the display to display an edit menu by holding-down the selected row. The user selects "insert" from the edit menu. To delete a row, the user selects the row to be deleted and displays an edit menu by holding-down the selected row. The user selects "delete" from the edit menu. To move a row, the user selects the row to be moved and displays an edit menu by holding-down the selected row. The user selects "Cut" from the edit menu. Next, the user selects a row to which the selected row is to be moved and displays an edit menu by holding-down the selected row. The user selects "insert clipped row" from the edit menu.

As described above, the user repeatedly selects the menu for editing, and such operation is complicated. Accordingly, the operability may be lowered.

Embodiment 1

Figure 1A:
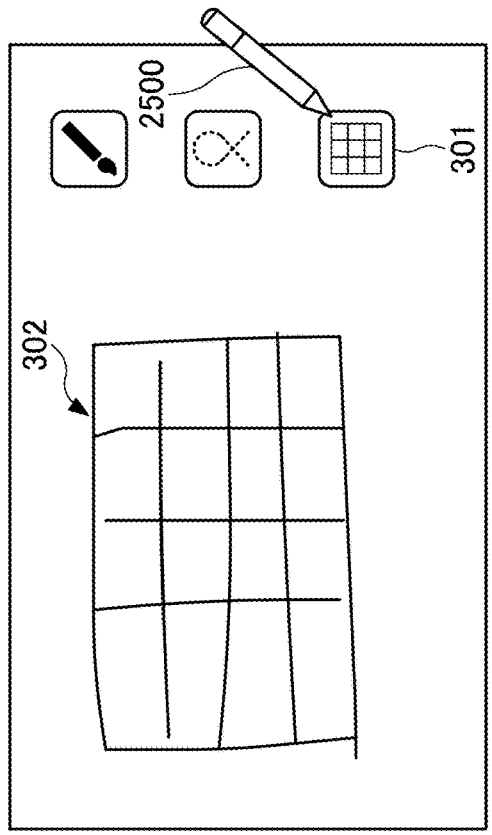

Next, a description is given below of the display apparatus 2 for assisting a user to select a table and a method performed by the display apparatus 2 according to an embodiment of the present disclosure. Referring to FIGS. 1A and 1B, a description is given of a procedure of creating a table. FIGS. 1A and 1B are diagrams illustrating an example of operation in which the display apparatus 2 receives an input of a table. The user can input (draw) characters or the like on a screen with an input device (input means) such as a hand or an electronic pen 2500.

1) The user presses an icon 301 for inputting a table (FIG. 1A).

2) The user handwrites a table 302 freehand. That is, the user creates a table using data having one or more stroke data (hereinafter "handwritten data").

3) The display apparatus 2 recognizes the handwritten data and converts handwritten data into a table 303 (FIG. 1B). That is, the display apparatus 2 displays the table 303 formed by a plurality of parallel vertical straight lines and a plurality of parallel horizontal straight lines.

The display apparatus 2 according to the present embodiment allows the user to edit the table 303 by handwriting in the following editing procedure. The display apparatus 2 receives selection of a row or a column based on handwritten data.

1) The user selects a portion of the table with handwritten data.

2) When the user selects any row or column (hereinafter also "table element") of the table, the display apparatus 2 adds the row (column) above (left) or below (right) the row (column) according to a simple user operation.

3) Similarly, when any one row (column) of the table is selected, the display apparatus 2 deletes the row (column) according to a simple user operation.

4) Similarly, the display apparatus 2 moves a selected row or column (Xth row or column) of the table to any different row or column (Yth row or column) according to a simple user operation.

5) Similarly, the display apparatus 2 moves a selected row or column (Xth row or Xth column) from the table to a desirable position outside the table according to a simple user operation.

Figures 2A, 2B:
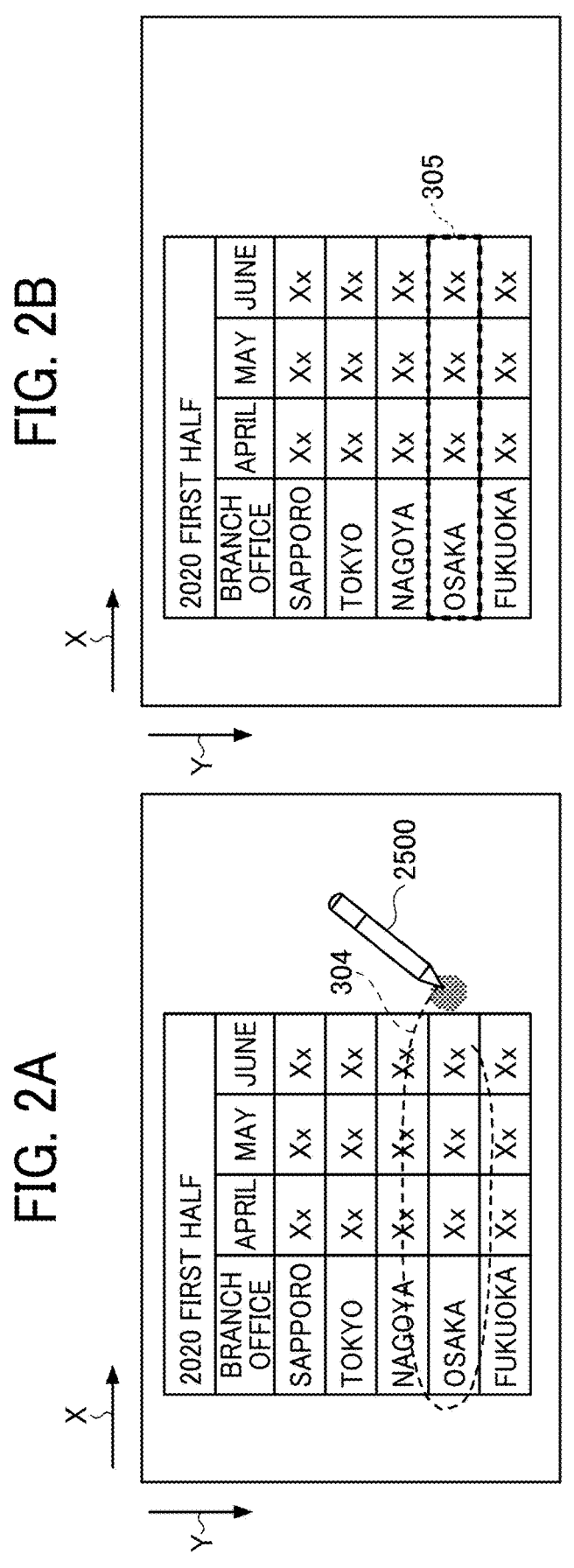

FIGS. 2A and 2B are diagrams illustrating an example of a method for selecting a row in a table. For example, as illustrated in FIG. 2A, the user can select a certain row by enclosing the row with a handwritten frame 304. The display apparatus 2 determines whether or not a row object is present in an area within the frame 304. When the object within the frame 304 is a row, as illustrated in FIG. 2B, the display apparatus 2 sets the row of "Osaka" in the selected state.

The selected state is a state in which the display apparatus 2 highlights the selected table element so that the user recognizes the table element. In addition, the display apparatus 2 enters a state of waiting for an operation on the selected table element. As will be described later, the user can edit a table by handwriting input with the input device such as the electronic pen 2500 (or a hand), without operating a menu, or with a minimum menu operation. For example, the user instructs the display apparatus 2 to add a row above or below the selected row, delete the selected row, or move the selected row. The same applies to a column. Note that making a row or column in a selected state by the user is not a requisite. The display apparatus 2 may perform editing such as deletion or moving without a user operation to making a table element in a selected state. Internally, when a specific column or row is to be edited, the column or row is set in an editing state.

As described above, according to the present embodiment, the display apparatus 2 performs editing (such as adding, moving, or deleting of a row or a column) regarding a selected row or column, based on handwritten data corresponding to a user operation. Thus, operability improves.

Terms

"Input device" may be any means capable of handwriting by designating coordinates on a touch panel. Examples thereof include a pen, a human finger, a human hand, and a bar-shaped member.

A series of user operations including engaging a writing mode, recording movement of an input device or portion of a user, and then disengaging the writing mode is referred to as a stroke. The engaging of the writing mode may include, if desired, pressing an input device against a display or screen, and disengaging the writing mode may include releasing the input device from the display or screen. Alternatively, a stroke includes tracking movement of the portion of the user without contacting a display or screen. In this case, the writing mode may be engaged or turned on by a gesture of a user, pressing a button by a hand or a foot of the user, or otherwise turning on the writing mode, for example using a pointing device such as a mouse. The disengaging of the writing mode can be accomplished by the same or different gesture used to engage the writing mode, releasing the button, or otherwise turning off the writing mode, for example using the pointing device or mouse.

"Stroke data" is data based on a trajectory of coordinates of a stroke input with the input device, and the coordinates may be interpolated appropriately.

"Handwritten data" is data having one or more stroke data.

"Handwriting input" represents input of handwritten data by the user.

An "object" refers to an item displayed on a screen. The term "object" in this specification represents an object of display.

Examples of character strings, converted from stroke data by character recognition, include, in addition to texts, data based on a user operation, such as a stamp of a given character or mark such as "complete," a graphic such as a circle or a star, or a line.

A character string is one or more character codes (fonts) converted from handwritten data by character recognition. The character string may be one or more characters handled by a computer. Characters include numbers, alphabets, symbols, and the like. The character string is also referred to as text data.

A display component is a display such as a color or a shape forming a screen. The display component is not a component disassembled from the display apparatus 2 but any component visually distinguished from other components and recognized by a person. For example, a menu for operation is a display component.

A table refers to information written in an array (tabular form). The table has cells arranged in horizontal and vertical directions. Cells arranged in the horizontal direction are referred to as a "row" and cells arranged in the vertical direction are referred to as a "column."

Editing refers to altering (correction, addition, or deletion) something such as a manuscript. In the present specification, editing refers mainly to operations relating to tables. For example, editing includes adding, deleting, moving, and copying a row (or a column), dividing a table, and the like.

Example Structure of Display Apparatus

Figure 3:
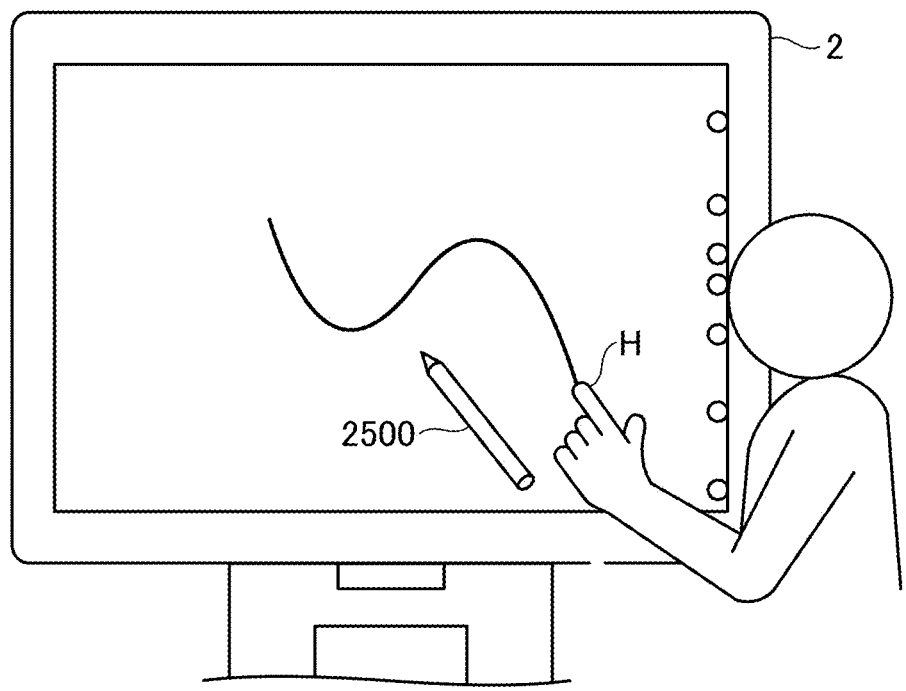
FIG. 3 is a schematic view illustrating an example of a configuration of a display apparatus according to one embodiment.

FIG. 3 is a schematic perspective view illustrating an example structure of the display apparatus 2. In FIG. 3, a user is using the display apparatus 2. In the display apparatus 2 according to the present embodiment, the user can perform handwriting on a screen with an input device such as a hand H or the electronic pen 2500.

Although the display apparatus 2 illustrated in FIG. 3 is placed landscape, the display apparatus 2 may be placed portrait. The user can rotate the display apparatus 2 around the center of the display as an axis for switching between the landscape placement and the portrait placement.

Hardware Configuration

Figure 4:
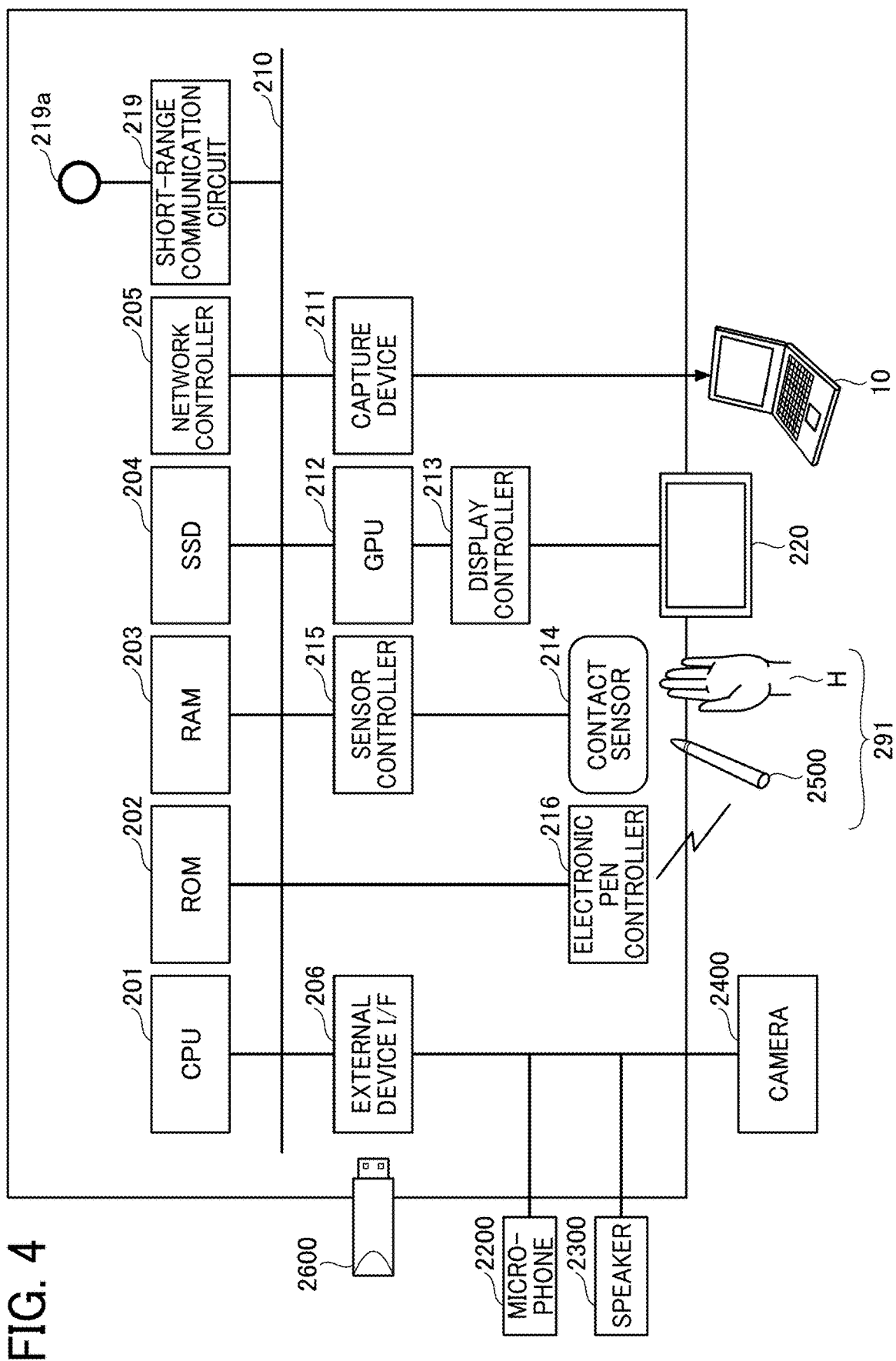
FIG. 4 is a block diagram illustrating an example of a hardware configuration of the display apparatus according to one embodiment.

FIG. 4 is a block diagram illustrating an example of a hardware configuration of the display apparatus 2. The display apparatus 2 includes a central processing unit (CPU) 201, a read only memory (ROM) 202, a random-access memory (RAM) 203, a solid-state drive (SSD) 204, a network controller 205, and an external device interface (I/F) 206. The display apparatus 2 is a shared terminal for sharing information.

The CPU 201 controls entire operation of the display apparatus 2. The ROM 202 stores a control program such as an initial program loader (IPL) to boot the CPU 201. The RAM 203 is used as a work area for the CPU 201.

The SSD 204 stores various data such as a control program for the display apparatus 2. This program may be an application program that runs on an information processing apparatus equipped with a general-purpose operating system (OS) such as WINDOWS, MAC OS, ANDROID, and IOS. In this case, the display apparatus 2 is usually used as a general-purpose information processing terminal. However, when a user executes an installed application program, the display apparatus 2 receives handwriting or the like performed by the user similarly to a dedicated display apparatus.

The network controller 205 controls communication with an external device through a network, and may be implemented by, for example, a network interface circuit. The external device I/F 206 controls communication with a universal serial bus (USB) memory 2600, and external devices such as a camera 2400, a speaker 2300, and a microphone 2200.

The display apparatus 2 further includes a capture device 211, a graphics processing unit (GPU) 212, a display controller 213, a contact sensor 214, a sensor controller 215, an electronic pen controller 216, the short-range communication circuit 219, and an antenna 219a for the short-range communication circuit 219.

The capture device 211 causes a display of a personal computer (PC) 10 to display a still image or a motion video based on image data captured by the capture device 211. The GPU 212 is a semiconductor chip dedicated to graphics. The display controller 213 controls display of an image output from the GPU 212 to a display 220.

The contact sensor 214 detects a touch of the electronic pen 2500 or the user's hand H onto the display 220. The electronic pen 2500 and the hand H are collectively referred to as input devices 291 when not distinguished from each other.

The sensor controller 215 controls operation of the contact sensor 214. The contact sensor 214 inputs and detects coordinates by an infrared blocking system. The inputting and detecting a coordinate may be as follows. For example, two light receiving and emitting devices are disposed at both ends of the upper side of the display 220, and a reflector frame surrounds the periphery of the display 220. The light receiving and emitting devices emit a plurality of infrared rays in parallel to a surface of the display 220. The rays are reflected by the reflector frame, and a light-receiving element receives light returning through the same optical path of the emitted infrared rays.

The contact sensor 214 outputs an identifier (ID) of the infrared ray that is blocked by an object after being emitted from the two light receiving and emitting devices, to the sensor controller 215. Based on the ID of the infrared ray, the sensor controller 215 detects specific coordinates that is touched by the object. The electronic pen controller 216 communicates with the electronic pen 250) to detect a touch of the tip or bottom of the electronic pen 2500 on the display 220. The short-range communication circuit 219 is a communication circuit in compliance with a near field communication (NFC), a BLUETOOTH, or the like.

The display apparatus 2 further includes a bus line 210. Examples of the bus line 210 include an address bus and a data bus, which electrically connect the components including the CPU 201, one another.

The system of the contact sensor 214 is not limited to the infrared blocking system. Examples of the system employed by the contact sensor 214 include types of detector such as a capacitance touch panel that identifies the contact position by detecting a change in capacitance, a resistance film touch panel that identifies the contact position by detecting a change in voltage of two opposed resistance films, and an electromagnetic induction touch panel that identifies the contact position by detecting electromagnetic induction caused by contact of an object to the display. In addition to or alternative to detecting a touch by the tip or bottom of the electronic pen 2500, the electronic pen controller 216 may also detect a touch by another part of the electronic pen 2500, such as a part held by a hand of the user.

Functions

Figure 5:
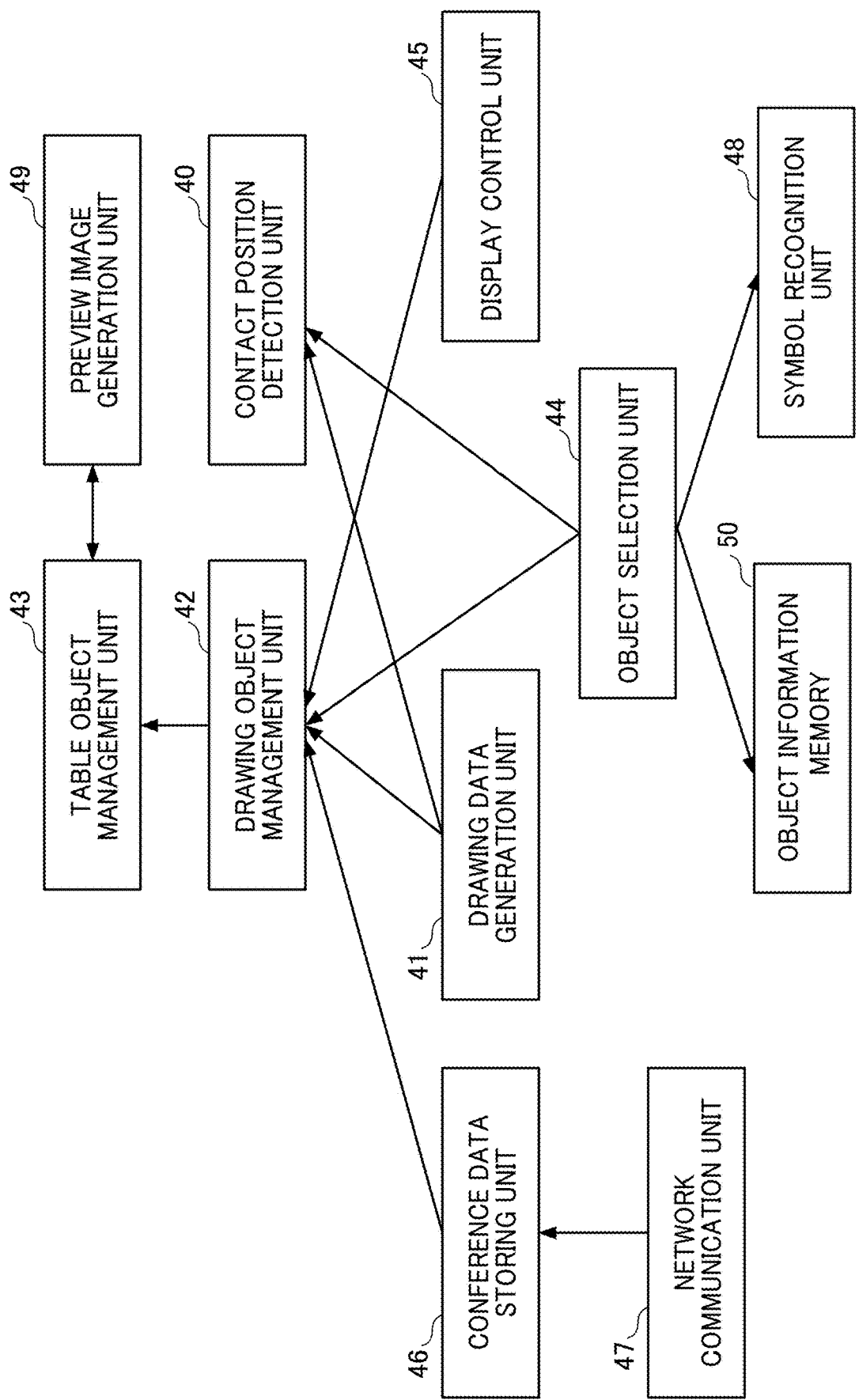
FIG. 5 is a block diagram illustrating an example of a functional configuration of the display apparatus according to one embodiment.

A description is now given of a functional configuration of the display apparatus 2 according to the present embodiment, with reference to FIG. 5. FIG. 5 is a block diagram illustrating an example of the functional configuration of the display apparatus 2 according to the present embodiment. The display apparatus 2 includes a contact position detection unit 40, a drawing data generation unit 41, a drawing object management unit 42, a table object management unit 43, an object selection unit 44, a display control unit 45, a conference data storing unit 46, a network communication unit 47, a symbol recognition unit 48, and a preview image generation unit 49. The functional units of the display apparatus 2 are implemented by or are caused to function by operation of any of the elements illustrated in FIG. 4 according to an instruction from the CPU 201 according to a program loaded from the SSD 204 to the RAM 203.

The contact position detection unit 40 detects coordinates detected by the contact sensor 214 in response to contact of the tip of the input device 291 with the display 220. The drawing data generation unit 41 acquires the coordinates (i.e., contact coordinates) of the position touched by the tip of the input device 291 from the contact position detection unit 40. The drawing data generation unit 41 connects coordinate points into a coordinate point sequence by interpolation, to generate stroke data. In addition, the drawing data generation unit 41 generates a graphic, such as a circle or a rectangle, or a symbol, recognized by the symbol recognition unit 48 from the handwritten data.

The drawing object management unit 42 stores (manages), as drawing objects, an area of the object generated by the drawing data generation unit 41 based on handwriting recognition by the symbol recognition unit 48, an area of a graphic such as a circle or a rectangle, and an area such as a table by, for example, assigning drawing object IDs to these areas. The drawing object management unit 42 also stores the display positions (coordinates) of such drawing objects. The drawing object management unit 42 controls the drawing object ID and the display position of the table object. The table object management unit 43 controls objects such as rows and columns in the table. The table object management unit 43 controls handwritten data and character strings in the table, and performs processing specific to the table, such as changing the order of rows and columns.

The object selection unit 44 receives selection of an area formed by handwritten data or a row or column selected by handwritten data having a particular shape such as an arrow. The object selection unit 44 may receive the selection of a cell. The object selection unit 44 sets an object to a selected state.

The display control unit 45 displays handwritten data, a character string, a table, an operation menu, and the like on the display 220. The network communication unit 47 connects the network controller 205 to a network such as a local area network (LAN) or the Internet, and transmits and receives data to and from other devices via the network.

The conference data storing unit 46 stores presentation materials (files), handwritten data, image data, character strings, and the like used in the conference in a memory such as a hard disk or any desired memory illustrated in FIG. 4.

The preview image generation unit 49 displays the result of moving a row, the result of dividing a table, and the like, as a preview data image, before the table object management unit 43 actually moves the row or divides the table.

Drawing Object Information and Row Object Information

FIG. 6 schematically illustrates drawing object information stored in the memory by the drawing object management unit 42. The drawing object information is information for controlling a drawing object displayed by the display apparatus 2. In FIG. 6, the drawing object information includes the drawing object ID, a row object ID, start point coordinates, end point coordinates, and an object type.

The drawing object ID is identification information identifying a drawing object. The drawing object refers to various objects displayed on the screen. In FIG. 6, the objects having a drawing object ID "001" is rows of one table. The bottom row of FIG. 6 has a drawing object ID "002" representing handwritten object such as an enclosing line or an arrow handwritten in the table.

The row object ID is identification information that is set to a row object of a drawing object that is a table and identifies the row. A row object is one row in a table. Similarly, a column object ID is assigned to a column object.

The start point coordinates indicate the position of the start point of the drawing object with reference to a predetermined origin on the screen of the display apparatus 2. The starting point of the drawing object is, for example, the upper left corner of the circumscribed rectangle of the drawing object. The coordinates are expressed, for example, in pixels of the display 220.

The end point coordinates indicate the position of the end point of the drawing object with reference to the predetermined origin on the screen of the display apparatus 2. The end point of the drawing object is, for example, the lower right corner of the circumscribed rectangle of the drawing object.

The object type represents the type of drawing object. Examples of the object type include table (row or column), handwriting, character string, graphic, and image. "Table (row)" represents a row object. "Handwriting" represents stroke data (coordinate point sequence). "Character string" represents a string of characters (character codes) converted from handwritten data. A character string may be referred to as text data. "Graphic" is a geometric shape, such as a triangle or a tetragon, converted from handwritten data. "Image" represents image data in a format such as Joint Photographic Experts Group (JPEG). Portable Network Graphics (PNG), or Tagged Image File Format (TIFF) acquired from, for example, a PC or the Internet.

FIG. 7 schematically illustrates the row object information. The row object information is information obtained by extracting a row object from a drawing object.

The row object ID (or column object ID) is identification information identifying a row (or column) in the table.

The start point coordinates are coordinates of a starting point of one row.

The end point coordinates are coordinates of an end point of one row.

Example of Selection of Row or Column of Table

Figure 8B:
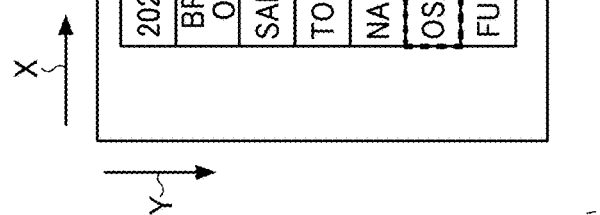
FIGS. 8A and 8B are diagrams illustrating an example of a method for selecting a row of a table on a display, according to one embodiment.
Figure 8A:
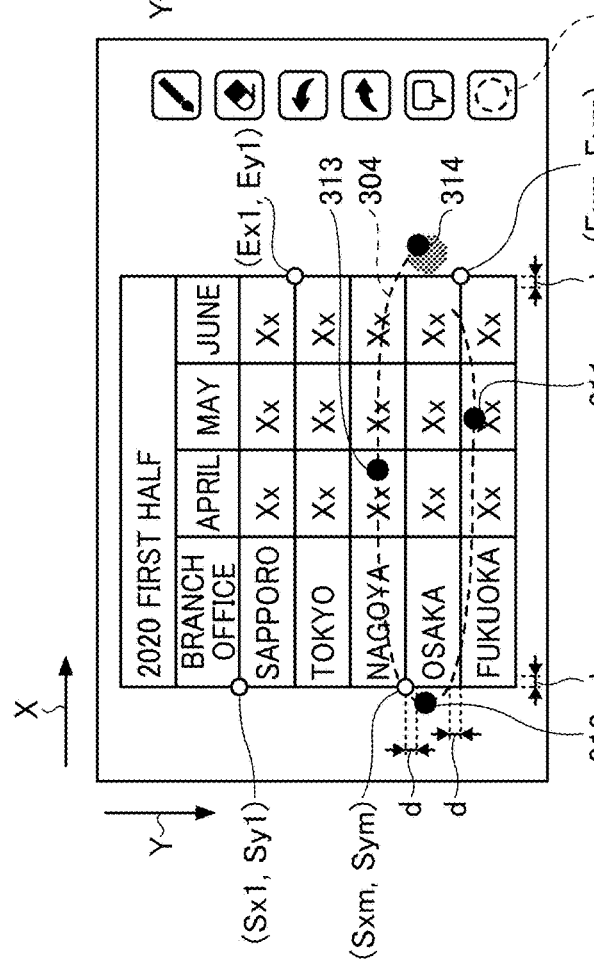

FIGS. 8A and 8B are diagrams illustrating a method for selecting a row included in a table. First, a description is given of the display position of the row object controlled by the drawing object management unit 42 with reference to FIGS. 8A and 8B. The positions of display pixels on the display 220 are expressed by display coordinates in which the origin is a pixel position at an upper left corner of a display area, the rightward direction is a positive direction of an X axis, and a downward direction is a positive direction of a Y axis.

That is, the coordinates are the number of pixels in the X-axis direction from the pixel at the origin position, the number of pixels in the Y-axis direction from the pixel at the origin position).

Further, the drawing object management unit 42 controls the area of the drawing object by a rectangle that circumscribes the drawing object. The drawing object management unit 42 sets a pixel position at an upper left corner of the rectangular area as start point coordinates and a pixel position at a lower right corner of the rectangular area as an end point coordinates. In the case of a row object, coordinates of the upper left corner of the circumscribed rectangle of the row are set as the start point coordinates (Sxk,Syk), and coordinates of the lower right corner of the circumscribed rectangle are set as the end point coordinates (Exk, Eyk). In the coordinates, a variable "k" represents a row number given in order from the first row. For example, if a mth row is selected, the start point coordinates are (Sxm, Sym) and the end point coordinates are (Exm,Eym).

It is assumed that intervals between the contact coordinates on the touch panel are the same as intervals between the display coordinates on the display 220, and the coordinates on the touch panel coincide with those on the display 220.

In FIG. 8A, the display apparatus 2 is displaying a table. When the user selects an object selection icon 310, the drawing object management unit 42 determines that the display apparatus 2 is in an object selection mode based on the coordinates detected by the contact position detection unit 40. Pressing the object selection icon 310 is not a requisite. When the input stroke data is recognized as a handwritten frame 304 surrounding a table element or when the stroke data is at the distance L from the table and recognized as a symbol (e.g., arrow) for selecting the table element, the display apparatus 2 receives selection of the table element even when the object selection icon is not pressed.

The user handwrites a frame 304 that surrounds a row having a branch item "Osaka." The object selection unit 44 calculates coordinates of a bottom end 311, a left end 312, a top end 313, and a right end 314 from the coordinates of the frame 304 detected by the contact position detection unit 40, and determines that the handwritten frame 304 surrounds a row of Osaka (details will be described with reference to a flowchart). Then, the object selection unit 44 sets the row of Osaka in the selected state. Although only one row is selected in FIG. 8A, the user can select a plurality of rows.

Figure 9:
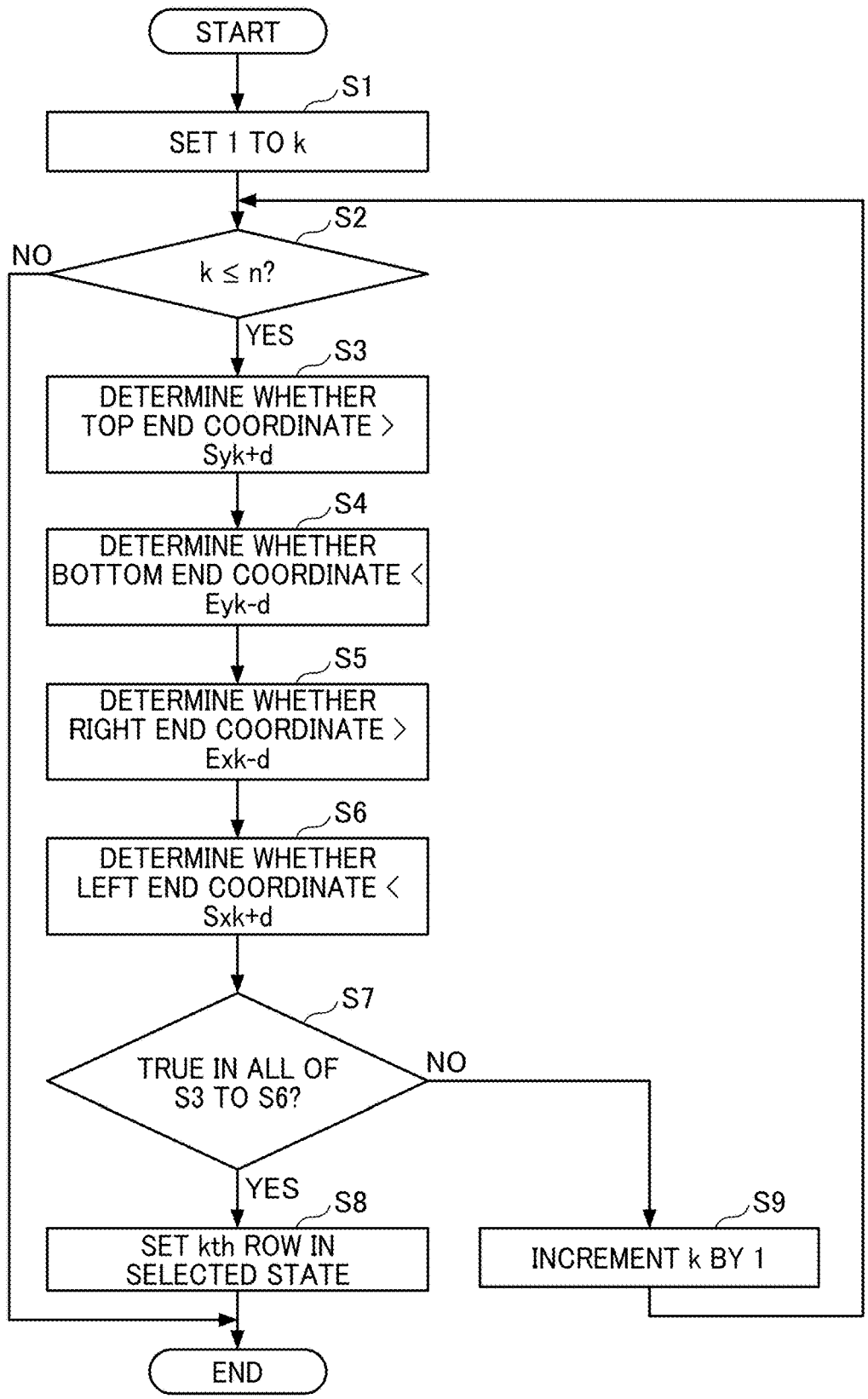
FIG. 9 is a flowchart illustrating a procedure for receiving selection of a row of a table object by the method illustrated in FIGS. 8A and 8B.

A detailed description is given of such selection with reference to FIG. 9. FIG. 9 is a flowchart illustrating a procedure for receiving selection of a row of a table object by the method illustrated in FIGS. 8A and 8B. In FIG. 8A, the row object IDs, 1, 2, . . . n are assigned to the rows in order from the row of Sapporo. The coordinates of the upper left corner of the circumscribed rectangle of the mth row surrounded by the handwritten data by the user are set as start point coordinates (Sxm,Sym), and the coordinates of the lower right corner are set as end point coordinates (Exm,Eym).

The outline of the processing in FIG. 9 is as follows. When the user surrounds a row in the object selection mode, the object selection unit 44 determines whether the stroke data surrounds an area smaller than the kth row by an amount d from the coordinates detected by the contact position detection unit 40. The amount d is a margin for selecting a row even when stroke data does not fully surround one row. When the object selection unit 44 determines that the area surrounded by the stroke data is smaller than the kth row by the amount d, the object selection unit 44 sets the row in the selected state. The object selection unit 44 repeats this processing from k=1 to the nth row.

Since the row of Osaka is selected in FIG. 8A, the row of Osaka is in a selected state in FIG. 8B. The object selection unit 44 highlights the row of Osaka by changing the color thereof or by enclosing the row with a line 305.

The process is described with reference to FIG. 9. The object selection unit 44 sets the variable k to 1 (S1). The variable k represents a row number. In S2, the object selection unit 44 determines whether or not k is equal to or smaller than n (k≤n). In other words, the object selection unit 44 determines whether an end condition (k≤n is false) for ending the process is satisfied. The "n" is the number of rows included in the table. Based on the end condition, the object selection unit 44 determines that the determination of whether the row is surrounded by handwritten data has been made to the last row.

When the end condition is not satisfied, the object selection unit 44 determines whether or not the coordinate of the top end 313 is larger than Syk+d (S3).

Similarly, the object selection unit 44 determines whether or not the coordinate of the bottom end 311 is smaller than Eyk−d (S4).

The object selection unit 44 determines whether or not the coordinate of the right end 314 is larger than Exk−d (S5).

The object selection unit 44 determines whether or not the coordinates of the left end 312 is smaller than Sxk+d (S6).

When the determination is true in all of steps S3 to S6 (Yes in S7), the object selection unit 44 sets the kth row in the selected state (W).

In step S7, when one or more of steps S3 to S6 is No, the object selection unit 44 increment k by one (S9). That is, the object selection unit 44 determines whether or not the next row is selected.

Instead of determining whether or not all rows have been selected as illustrated in FIG. 9, the object selection unit 44 may determine only the rows on which the circumscribed rectangle of the stroke data overlaps.

In this way, the display apparatus 2 detects user selection of a row, even when the user selects a row by simply enclosing the row with stroke data.

Another Example of Selection of Row

As the method for the user to select a row, instead of enclosing a row with stroke data, the user may write an arrow next to a row to be selected.

Figure 10:
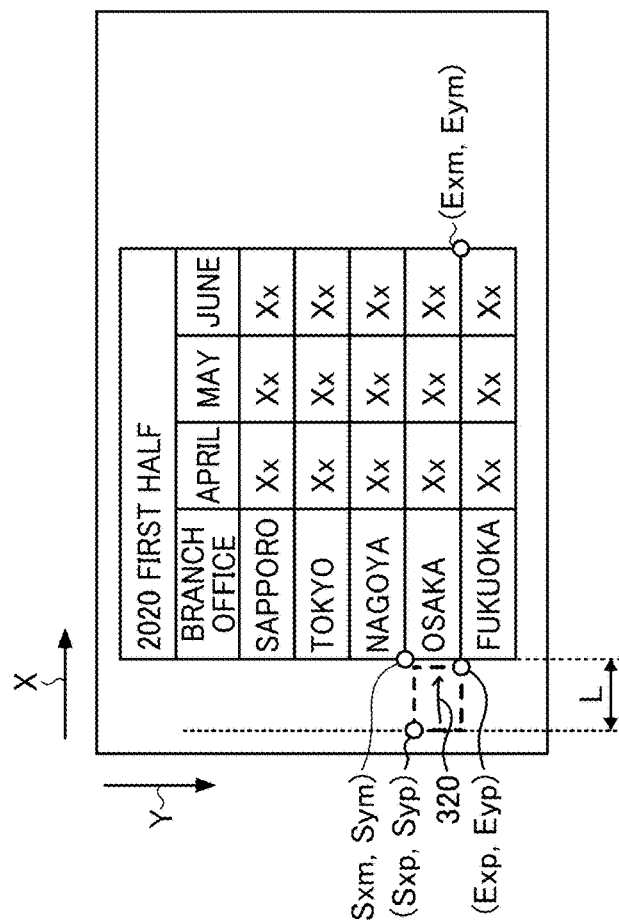
FIGS. 10A and 10B are diagrams illustrating a method for selecting a row of a table with an arrow on a display, according to one embodiment.

FIGS. 10A and 10B are diagrams illustrating a method in which a user selects a row with an arrow. As illustrated in FIG. 10A, the user handwrites an arrow 320 next to the row of branch office "Osaka" such that the arrow 320 has a pointed head toward the cell of "Osaka." The drawing object management unit 42 sets the coordinates of the upper left corner of the circumscribed rectangle of the arrow 320 as start point coordinates (Sxp,Syp), and sets the coordinates of the lower right corner as end point coordinates (Exp,Eyp).

Further, a range within a distance L from the outline of the table is determined as a symbol detection range in advance, for example, by the manufacture or an administrator. The display apparatus 2 recognizes that the handwritten data input, by the user, in the symbol detection range is a selecting symbol for selecting a row or a column of the table. That is, handwritten symbol is recognized as a selecting symbol. This is because there are cases where the user wishes to perform handwriting regardless of the selected row. In FIG. 10A, the arrow 320 is handwritten on the left side of the table. In addition, or alternatively, the range of the distance L from the right side of the table may be the detection range of the symbol.

When the object selection unit 44 determines that the handwritten data is an arrow and is adjacent to the row of Osaka based on the drawing object information, the object selection unit 44 sets the row of Osaka in the selected state. As illustrated in FIG. 10B, the line 305 encloses the selected row.

Figure 11:
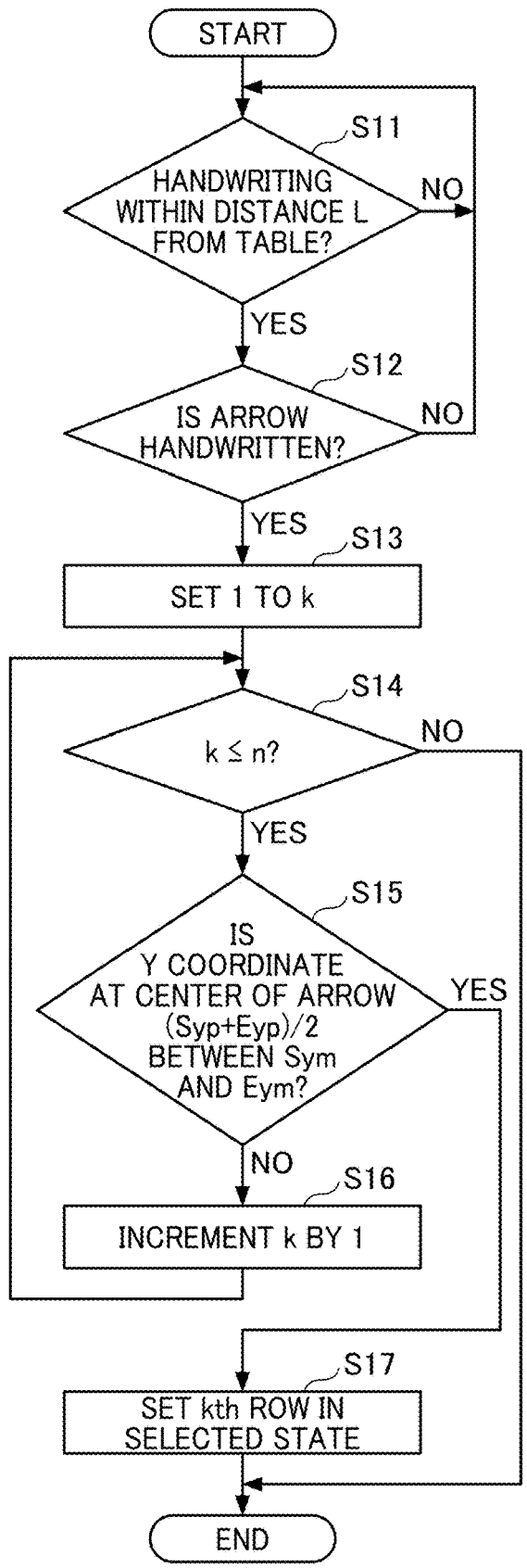
FIG. 11 is a flowchart illustrating a procedure for receiving selection of a row of a table object by the method illustrated in FIGS. 10A and 10B.

FIG. 11 is a flowchart illustrating a procedure for receiving selection of a row of a table object in the method illustrated in FIGS. 10A and 10B.

When the user handwrites the arrow 320 next to the row of Osaka, the object selection unit 44 acquires the coordinates and size of the drawing object from an object information memory 50, and determines whether or not there is handwritten data within the distance L from the table (S11). Taking the drawing object information table of FIG. 6 as an example, the arrow 320 in FIG. 10A is added as the drawing object having the drawing object ID "002" to the drawing object as the table.

Next, the table object management unit 43 determines whether or not the handwritten data is the arrow 320 (S12). That is, the table object management unit 43 determines whether handwritten data in the vicinity of the selected row has been recognized as a predetermined symbol (selecting symbol) by the symbol recognition unit 48. In the case of No in S it and S12, the process returns to S11.

In the case of the arrow 320, the object selection unit 44 sets 1 to the variable k (S13). The variable k represents a row number. The handwritten data is recognized by the symbol recognition unit 48. The arrow is an example, and various symbols such as check marks may be set as symbols for selection.

In S14, the object selection unit 44 determines whether or not k is equal to or smaller than n (k≤n). In other words, the object selection unit 44 determines whether the end condition (k≤n is false) is satisfied. The variable "n" represents the number of rows included in the table.

When the end condition is not satisfied, the object selection unit 44 determines whether or not a y coordinate ((Syp+Eyp)/2) at a center of the arrow 320 is between the coordinate (Sym) and the coordinate (Eym) corresponding to the height of the selected row (S15).

In a case where the determination of step S15 is Yes, the object selection unit 44 sets the kth row in the selected state (S17).

When the determination of step S15 is No, the object selection unit 44 increments k by one, and returns to step S14 (S16).

In this way, the display apparatus 2 detects user selection of a row, even when the user selects a row by handwriting a symbol adjacent to the row.

Instead of determining whether or not the row is selected for each row as illustrated in FIG. 11, the object selection unit 44 may perform the determination for only the row on which the Y coordinates of the stroke data overlap.

Example of Addition of Row

When the object selection unit 44 detects that the user selects a row, the display control unit 45 displays a button for adding a row and a button for deleting a row above or below the selected row. Such a button is an example of graphical representation for editing (adding, deleting, or moving) a table element.

Figures 12A, 12B:
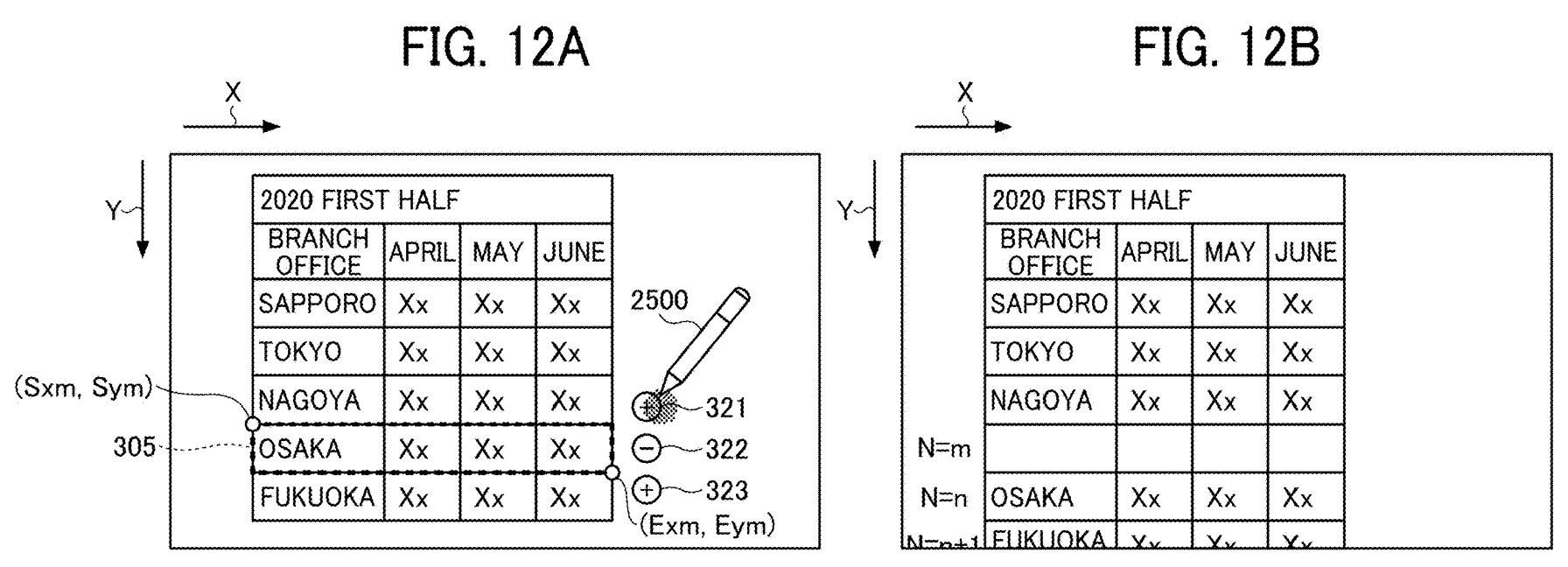

FIG. 12A illustrates an example of a table in which buttons 321 to 323 are displayed. In FIG. 12A, the three buttons 321 to 323 are displayed on the right of the selected row of Osaka. The positions of the buttons 321 to 323 are not limited to those illustrated in the drawing. The buttons 321 to 323 may be located any positions near the selected row.

The button 321 is used by the user to add a row above the selected row. The button 323 is used by the user to add a row below the selected row. The button 322 is used by the user to delete the selected row.

When the user presses the button 321, the table object management unit 43 adds a row above the row of Osaka (FIG. 12B) in the displayed table. The table object management unit 43 assigns a new row object ID to the added row as a serial number from the first row. Therefore, the added row is treated as the mth row, and the row object IDs of the selected row and subsequent rows are incremented by one.

FIGS. 13A and 13B illustrate table object information before and after addition of a row. FIG. 13A illustrates table object information before the addition of a row. FIG. 13B illustrates table object information after the addition of a row. The mth row (having the row object ID "00m") is the added row. Since a row is added, the number of rows increments by one from n to n+1.

Figure 14:
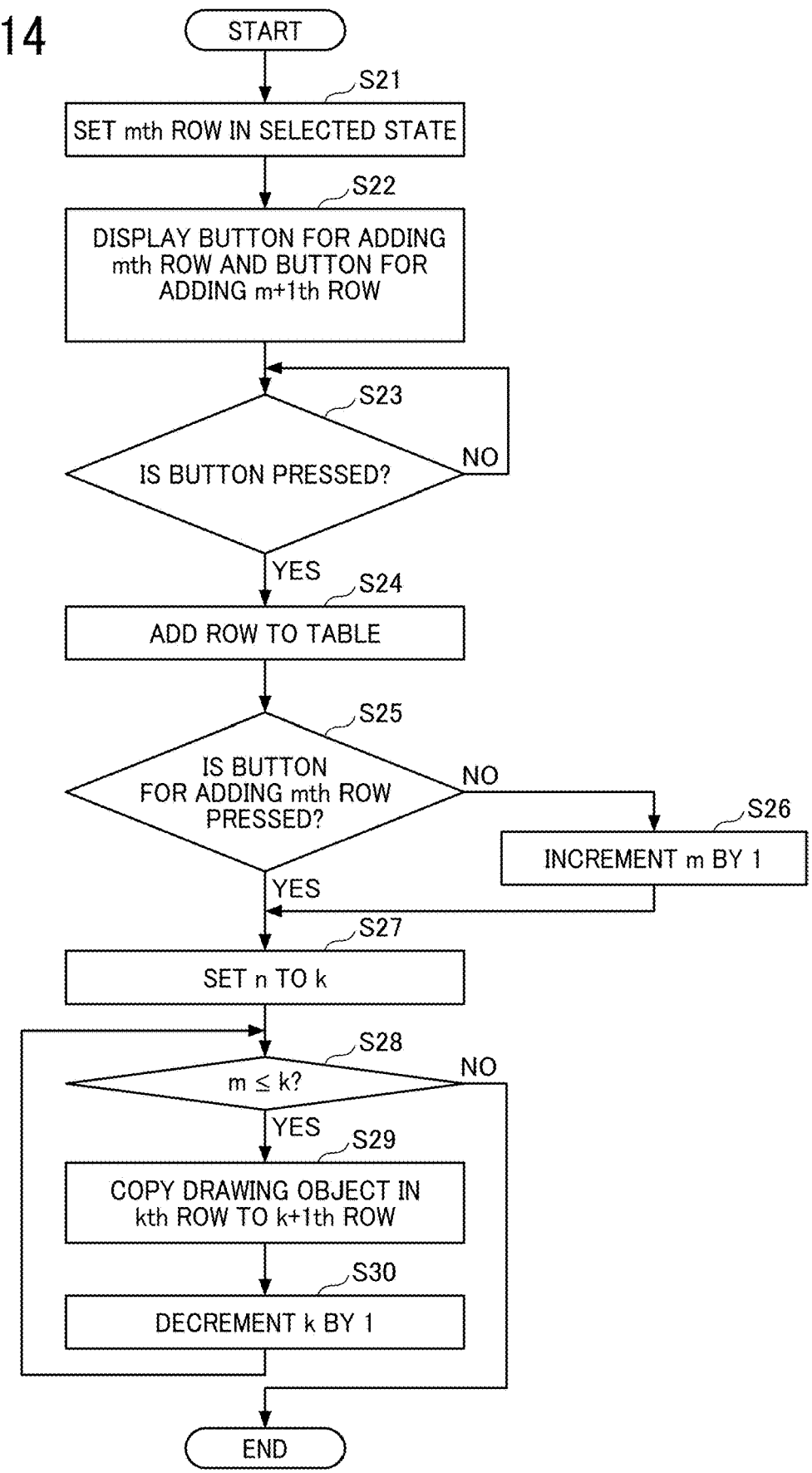
FIG. 14 is a flowchart illustrating an example of a process in which a display apparatus receives addition of a row by the method illustrated in FIGS. 13A and 13B.

FIG. 14 is a flowchart illustrating an example of a process in which the display apparatus 2 receives operation of addition of a row by the method illustrated in FIGS. 12A and 12B.

First, as described with reference to FIGS. 9 and 11, the object selection unit 44 sets the mth row in the selected state (S21).

Then, the display control unit 45 displays the button 321 for adding a row above the selected row (as a new mth row) and the button 323 for adding a (m+1)th row below the mth row (S22). The button 322, to be described in detail later, is also displayed.

The table object management unit 43 determines that the button 321 for adding a row is pressed depending on the contact position of the input device 291 detected by the contact position detection unit 40 (S23).

The table object management unit 43 adds one blank row to the end of the table (S24).

When the pressed button 321 is the button 321 for adding a row as the mth row (Yes in S25), the table object management unit 43 sets n to the variable k, to set the last row (S27). The variable k represents the row number.

When the pressed button 323 is the button 323 for adding a row as the (m+1)th row (No in S25), the table object management unit 43 increments m by one (S26). This is to end the copy processing one row earlier.

In S28, the table object management unit 43 determines whether the end condition (m≤k is false) is satisfied. The end condition is whether the serial number (variable k) of the row as the subject of copying is greater than the serial number (m) of the selected row.

When the end condition is not satisfied (Yes in S28), the table object management unit 43 copies the drawing object in the kth row to the (k+1)th row (S29). The drawing object in the kth row is deleted.

Then, the table object management unit 43 decrements k by one (S30), and repeats the process from step S28.

Therefore, the drawing object of the immediately upper row is copied to the immediately lower row until k decreases from n to n−1, n−2, and to m (or m+1).

In this manner, the display apparatus 2 adds a row, when the user instructs to add the row by enclosing a row by handwriting and pressing the button 321 or 323.

Second Example of Addition of Row

Next, with reference to FIGS. 15A, 15B, and 15C, another method (second method) for adding a row will be described.

Figures 15A, 15B, 15C:
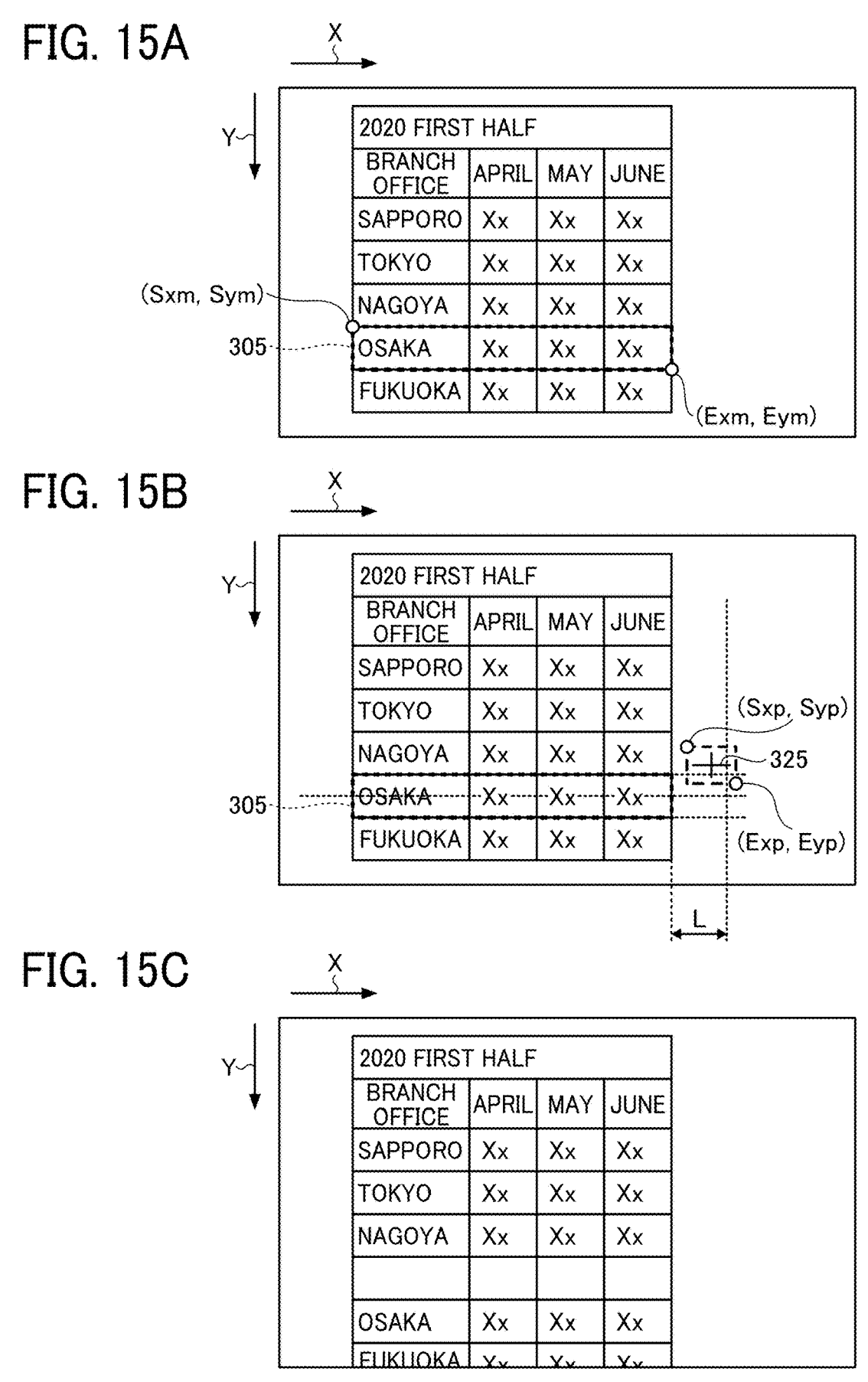

FIGS. 15A, 15B, and 15C are diagram illustrating a method for adding a row to a table using handwritten data.

In FIG. 15A, the row of Osaka is in the selected state. Next, as illustrated in FIG. 15B, the user handwrites a predetermined mark 325 above half the height of the row of Osaka. The mark 325 is an example of an adding symbol ("+" in this example) for adding a table element (row or column). The coordinates of the upper left corner of the circumscribed rectangle of the mark 325 "+" are (Sxp,Syp), and the coordinates of the lower right corner thereof are (Exp,Eyp).

The table object management unit 43 determines whether or not the handwritten data is the mark 325 "+." In the case of the mark 325 "4" the table object management unit 43 determines whether the written position is above or below the half of the selected row of Osaka. When it is determined that the written position is above the half the height of the row of Osaka, the table object management unit 43 adds a row above the row of Osaka (FIG. 15C in the displayed table. When it is determined that the written position is below the half the height of the row of Osaka, the table object management unit 43 adds a row below the row of Osaka in the displayed table.

Figure 16:
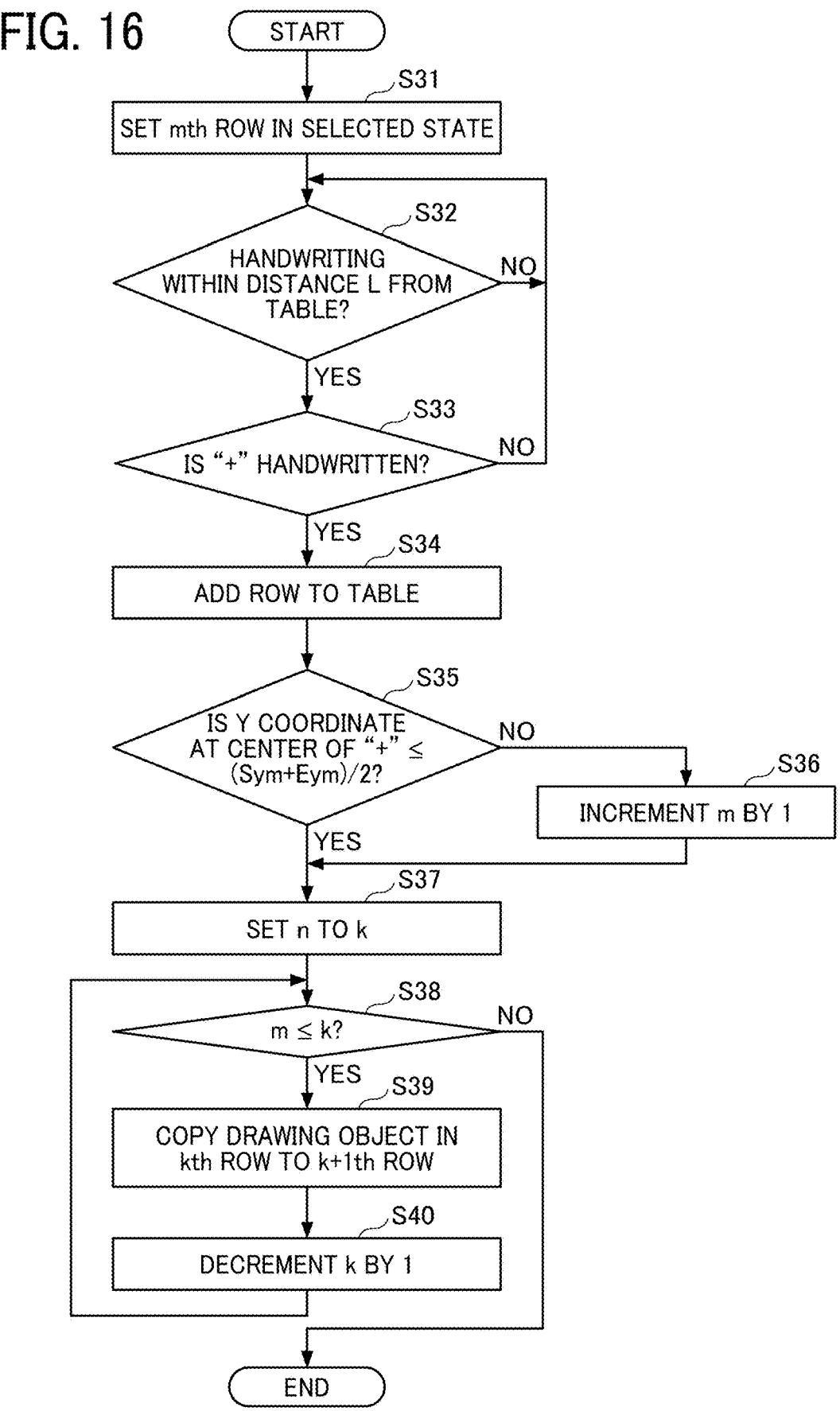
FIG. 16 is a flowchart illustrating an example of a process in which a display apparatus receives addition of a row by the method illustrated in FIGS. 15A to 15C.

FIG. 16 is a flowchart illustrating an example of a process in which the display apparatus 2 receives addition of a row by the method illustrated in FIGS. 15A to 15C. In the following description with reference to FIG. 16, the differences from FIG. 14 are described. In FIG. 16, a row is added by the handwritten data of the mark 325 "+," not the buttons 321 and 323.

The object selection unit 44 sets the mth row in the selected state (S31).

When the user handwrites the mark 325 "+" at the boundary between the row of Osaka and the row of Nagoya in FIG. 15A, the object selection unit 44 acquires the coordinates and size of the drawing object from the object information memory 50, and determines whether or not there is handwritten data within the distance L from the table (S32). Alternatively, without the step S31 (setting a row in the selected state), the step S32 may be performed (e.g., the display device 2 determines that the addition of a row is instructed when the mark 325 "+" is handwritten within the distance L from the table). This applies to S72 in FIG. 25, S82 in FIG. 28, and S92 in FIG. 31, S112 in FIG. 34, S132 in FIG. 37, and S152 in FIG. 40.

Next, the table object management unit 43 determines whether or not the symbol recognition unit 48 has recognized the mark 325 "+" (S33). The mark 325 "+" is an example, and other symbols may be for adding rows.

When the mark 325 "+" is handwritten, the table object management unit 43 adds one blank row to the end of the table (S34).

Next, the table object management unit 43 determines whether a y coordinate (Syp+Eyp)/2 at a center of the "+" mark is larger than the center coordinate (Sym+Eym)/2 of the height of the mth row (S35). The table object management unit 43 may determine the location of the mark 325 "+" by setting an upper limit and a lower limit with respect to the height direction of the selected row, in addition to simply determining whether the venter y coordinate is larger or smaller.

When the determination of step S35 is No, the table object management unit 43 increments m by one (S36).

The process from S37 to S40 is similar to that from S27 to S30 in FIG. 14. That is, when the determination of step S35 is Yes, the table object management unit 43 repeatedly copies the text of the kth row to the (k+1)th row from when k is n until k becomes m so that a new row is above the selected row.

When the determination in step S35 is No, the table object management unit 43 repeatedly copies the text of the kth row to the (k+1)th row from when k is n until k becomes m+1 so that a new row is added below the selected row. After the determination in S38 is No, the entry of the mark 325 "+" is also deleted from the drawing object information.

In this way, the display apparatus 2 adds a row, when the user instructs to add a row by enclosing a row by handwriting and by handwriting a "+" mark.

FIGS. 17A and 17B are tables of drawing object information before and after the addition of a row. FIG. 17A illustrates the drawing object information before the addition of the row, and FIG. 17B illustrates the drawing object information after the addition of the row. In FIG. 17A, the mth row (ID: 00m) is the selected row. When the y coordinate at the center of the mark 325 "+" is larger than that at the center height of the mth row, the mth row is added. In FIG. 17A, the handwritten data of the mark 325 "+" is registered with the drawing object ID "002." As described above referring to FIG. 6, the drawing object management unit 42 updates the drawing object information to control a drawing object to be displayed by the display apparatus 2.

In FIG. 17B, since a row is added, the number of rows is increased by one from n to n+1. Further, the mark 325 "+" having the drawing object ID "002" is deleted after the row is added, and the information thereof is deleted from the drawing object information table.

Third Example of Addition of Row

Figure 18B:
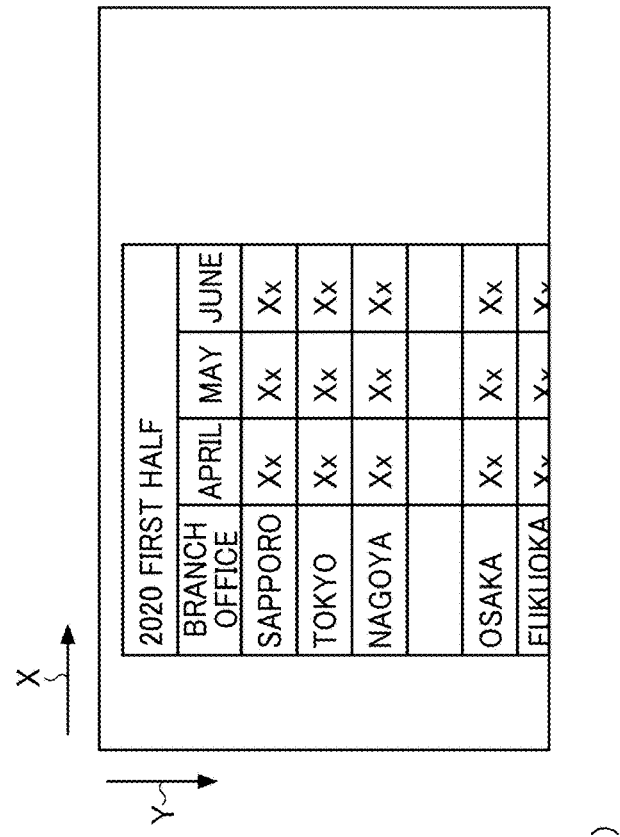
FIGS. 18A and 18B are diagrams illustrating an example of a method for adding a row using handwritten data of an insertion symbol on a display, according to one embodiment.
Figure 18A:
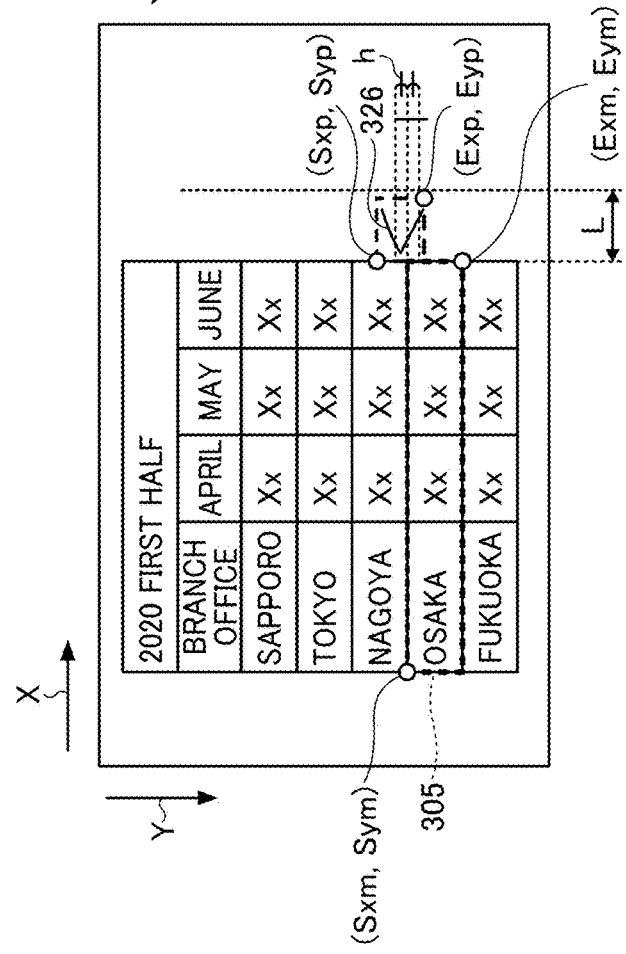

Next, with reference to FIGS. 18A and 18B, another method for adding a row (third method) will be described. FIGS. 18A and 18B are diagrams illustrating a method for adding a row using handwritten data of an insertion symbol.

In FIG. 18A, the row of Osaka is in a selected state. Next, the user handwrites a predetermined mark (the mark 326 "<") between the cell of Nagoya and the cell of Osaka. The table object management unit 43 determines that the handwritten data is the mark 326 "<" In the case of the mark 326 "<," the table object management unit 43 determines the boundary between rows pointed by the tip of the mark 326. When the position is determined as being between the row of Nagoya and the row of Osaka, the table object management unit 43 adds and displays a row above the row of Osaka (FIG. 18B).

Figure 19:
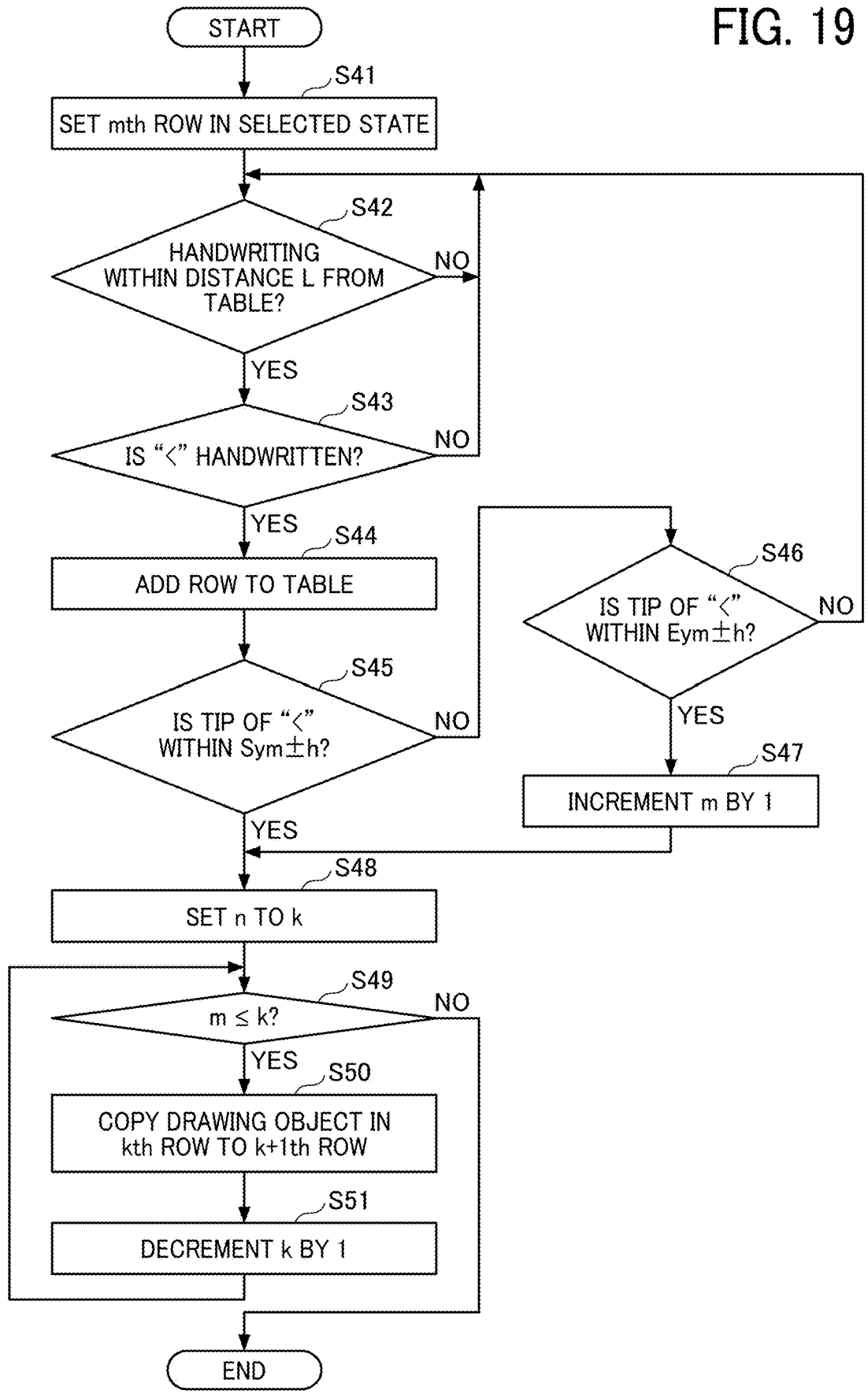
FIG. 19 is a flowchart illustrating an example of a process in which a display apparatus receives addition of a row by the method illustrated in FIGS. 18A and 18B.

FIG. 19 is a flowchart illustrating an example of a process in which the display apparatus 2 receives operation of addition of a row by the method illustrated in FIGS. 18A and 18B. In the following description with reference to FIG. 19, the differences from FIG. 16 are mainly escribed. In FIG. 19, a row is added by the handwritten data of not the mark 325 "+" but the mark 326 "<." First, steps S41 and S42 are the same as steps S31 and 32 of FIG. 16.

In step S43, the table object management unit 43 determines whether or not the symbol recognition unit 48 has detected a mark 326 "<" (S43).

The step S44 is similar to the step S34 of FIG. 16.

Then, the table object management unit 43 determines whether or not the tip of the mark 326 "<" is within a distance h (within a range of Sym±h) from the upper end of the selected row (S45). The distance h is a margin.

When the determination of step S45 is No, the table object management unit 43 determines whether or not the tip of the mark 326 is within the distance h (range of Eym±h) from the lower end of the selected row (S46). The distance h is a margin.

The subsequent process from S47 to S51 is similar to that from S36 to S40 in FIG. 16. That is, when the determination of step S45 is Yes, the table object management unit 43 repeatedly copies the text of the kth row to the (k+1)th row from when k is n until k becomes m so that a new row is added above the selected row.

When the determination in step S46 is Yes, the table object management unit 43 repeatedly copies the text of the kth row to the (k+1)th row from when k is n until k becomes m+1 so that a new row is added below the selected row.

In this way, the display apparatus 2 adds a row when the user instructs selection of a row by handwritten data and addition of a row by a handwritten "<" mark.

FIGS. 20A and 20B are tables of drawing object information before and after the addition of a row. In the following description with reference to FIG. 20, the differences from FIGS. 17A and 17B are described. FIGS. 20A and 20B have the same data structure as FIGS. 17A and 17B. In FIG. 20A, the handwritten data of the mark 326 "<" is registered with the drawing object ID "002." FIG. 20B may be the same as FIG. 17B.

First Example of Deletion of Row

Figure 21B:
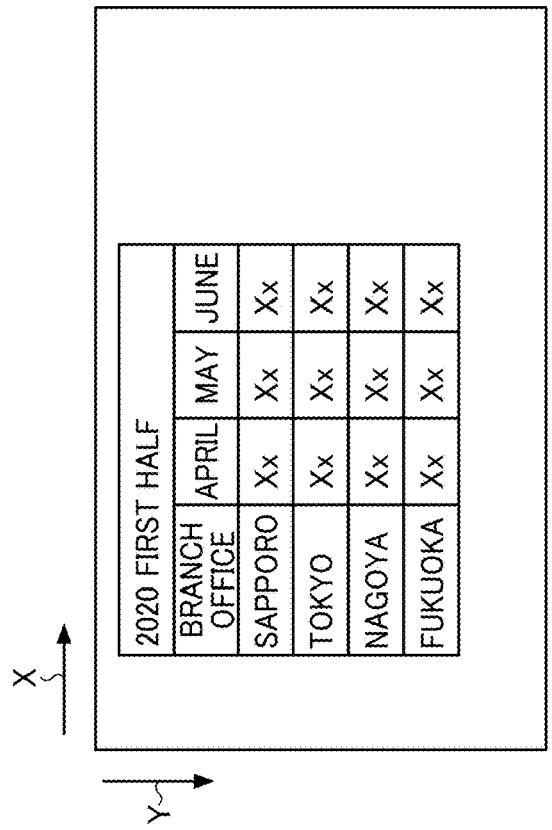
FIGS. 21A and 21B are diagrams illustrating an example of a method for deleting a row from a table on a display, according to one embodiment.
Figure 21A:
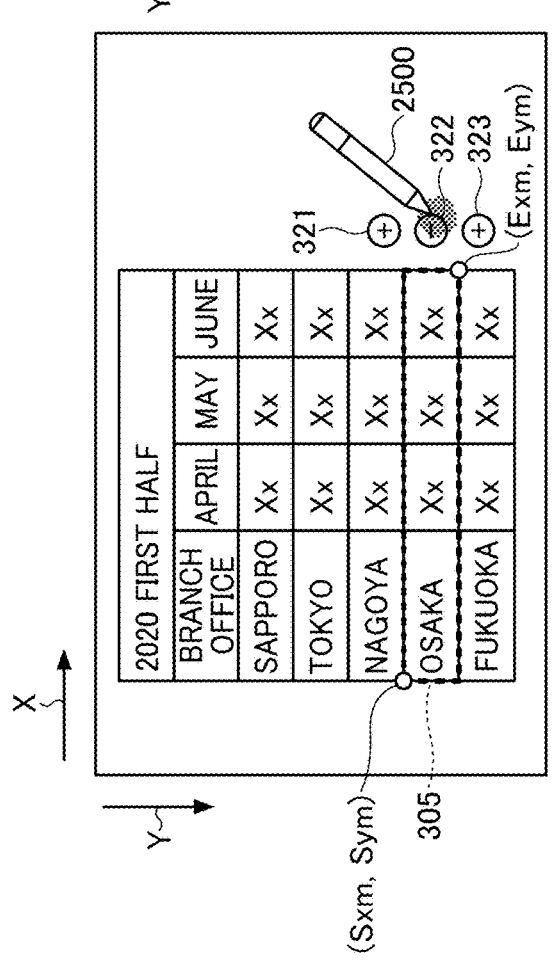

Next, a description is given below of a method for deleting a row, with reference to FIGS. 21A and 21B. FIGS. 21A and 21B are diagrams illustrating an example of a method for deleting a row from a table. The method of FIGS. 21A and 21B may be the same as that of FIGS. 12A and 12B until the buttons 321 to 323 are displayed in response to selection of a row.

As illustrated in FIG. 21A, when the row of Osaka is in the selected state, the display control unit 45 displays the button 322 for deleting the row on the right of the selected row.

When the user presses the button 322 for deleting the row of Osaka, the table object management unit 43 deletes the row of Osaka and displays the row of Fukuoka immediately below the row of Nagoya (FIG. 21B).

Figure 22:
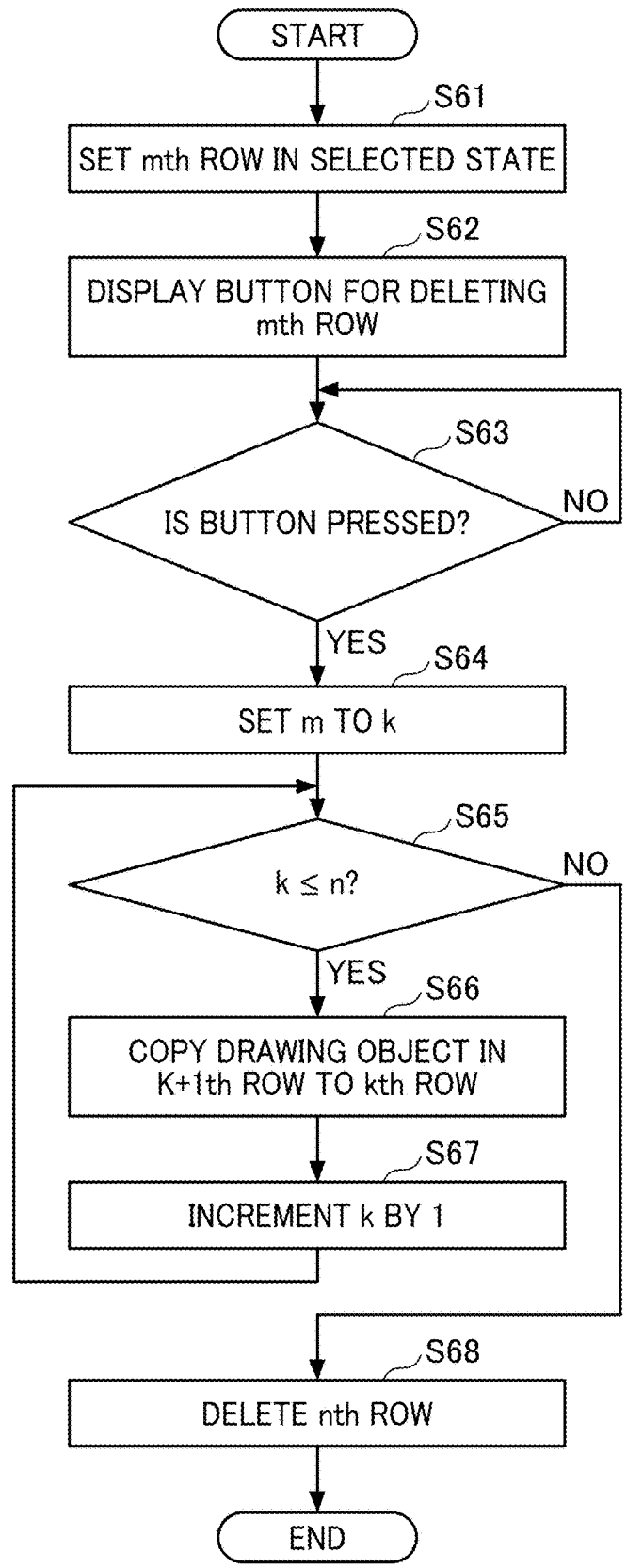
FIG. 22 is a flowchart illustrating an example of a process in which a display apparatus receives deletion of a row by the method illustrated in FIGS. 21A and 21B.

FIG. 22 is a flowchart illustrating an example of a process in which the display apparatus 2 receives operation of deletion of a row by the method illustrated in FIGS. 21A and 21B.

First, the object selection unit 44 sets the mth row to a selected state (S61).

Accordingly, the display control unit 45 displays the button 322 for deleting the mth row (S62).

The table object management unit 43 determines whether or not the button 322 for deleting the row is pressed depending on the contact position of the input device 291 detected by the contact position detection unit 40 (S63).

When the button 322 for deletion is pressed, the table object management unit 43 sets m to the variable k (S64). This is for moving the drawing objects in the (m+1)th and subsequent rows up one row at a time. For deleting a column, the drawing objects in the (m+1)th and subsequent columns are moved (to the left) one column at a time.

In S65, the table object management unit 43 determines whether the end condition (k≤n is false) is satisfied.

When the end condition is not satisfied (Yes in S65), the table object management unit 43 copies the drawing object (e.g., text) in the (k+1)th row to the kth row (S66).

Then, the table object management unit 43 increments k by one (S67), and repeats the process from step S65. Therefore, the table object management unit 43 repeats copying the text in the (k+1)th row to the kth row from when k is m until k becomes n.

When the end condition is satisfied (No in S65), the table object management unit 43 deletes the nth row (S68). That is, the table object management unit 43 deletes the lowest row.

In this manner, the display apparatus 2 deletes a row when the user instructs selection of a row by handwritten data and instructs deletion of the row by pressing a button.

FIGS. 23A and 23B are diagrams illustrating table object information before and after deletion. FIG. 23A illustrates the table object information before deletion, and FIG. 23B illustrates the table object information after deletion. The number of rows of table object information table has decreased from n to n−1. Since the mth row in FIG. 23A is deleted, the drawing object in the mth row of FIG. 23B is replaced with the contents of the (m+1)th row of FIG. 23A. As described above referring to FIG. 6, the drawing object management unit 42 updates the drawing object information to control a drawing object to be displayed by the display apparatus 2.

Second Example of Deletion of Row

Figures 24A, 24B:
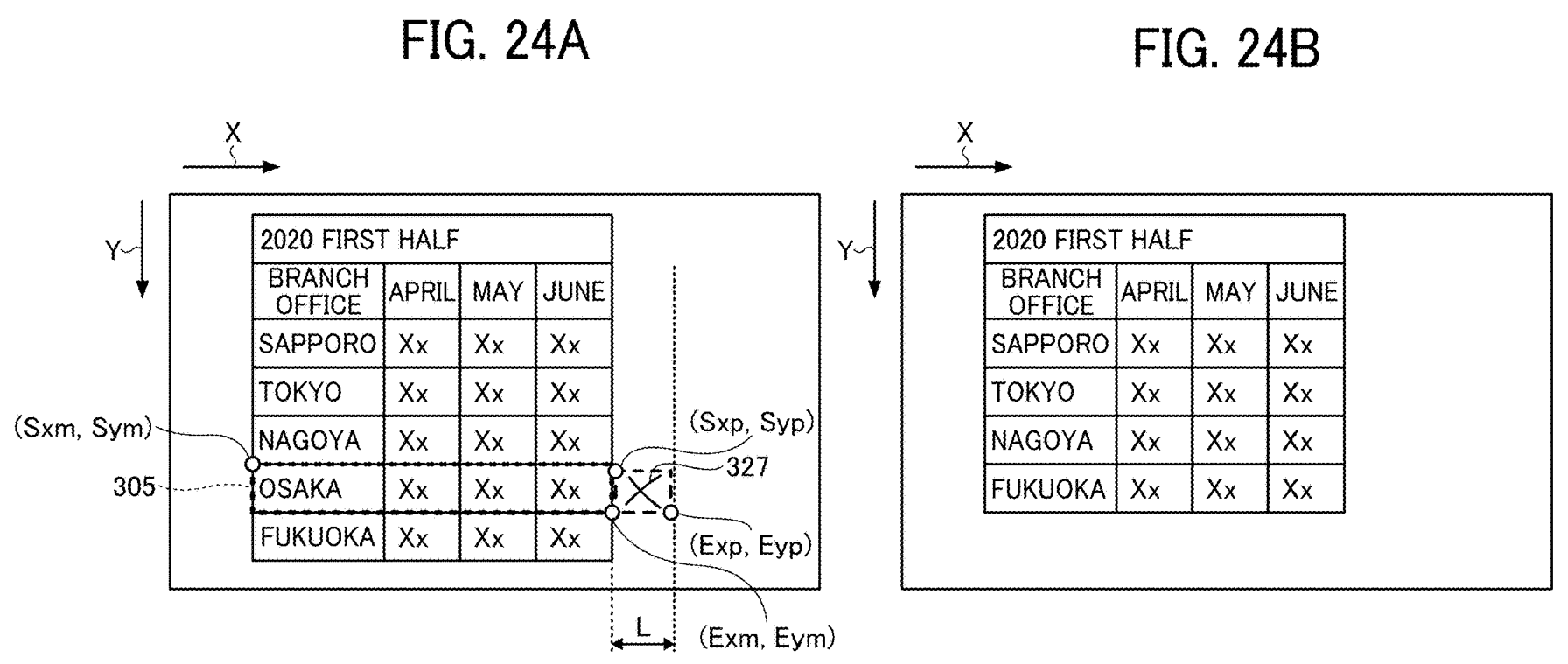

Next, with reference to FIGS. 24A and 24B, a second method for deleting a row will be described. FIGS. 24A and 24B are diagram illustrating a method for deleting a row from a table using handwritten data.

In FIG. 24A, the row of Osaka is in the selected state. Next, the user handwrites a predetermined mark (the mark 327 "−" in this case) next to the row of Osaka. Assume that symbol "x" represents "no" or "unnecessary." The mark 327 "x" is an example of a deleting symbol for deleting a table element. The table object management unit 43 determines that the handwritten data is the mark 327 "x". In the case of the mark 327 "−", the table object management unit 43 determines the row corresponding to the position where the mark 327 "x" is written. When the position is determined as being adjacent to the row of Osaka, the table object management unit 43 deletes the row of Osaka and displays the row of Fukuoka subsequent to the row of Nagoya (FIG. 24B). The adding symbol and the deleting symbol are examples of a symbol instructing to edit the selected table element.

Figure 25:
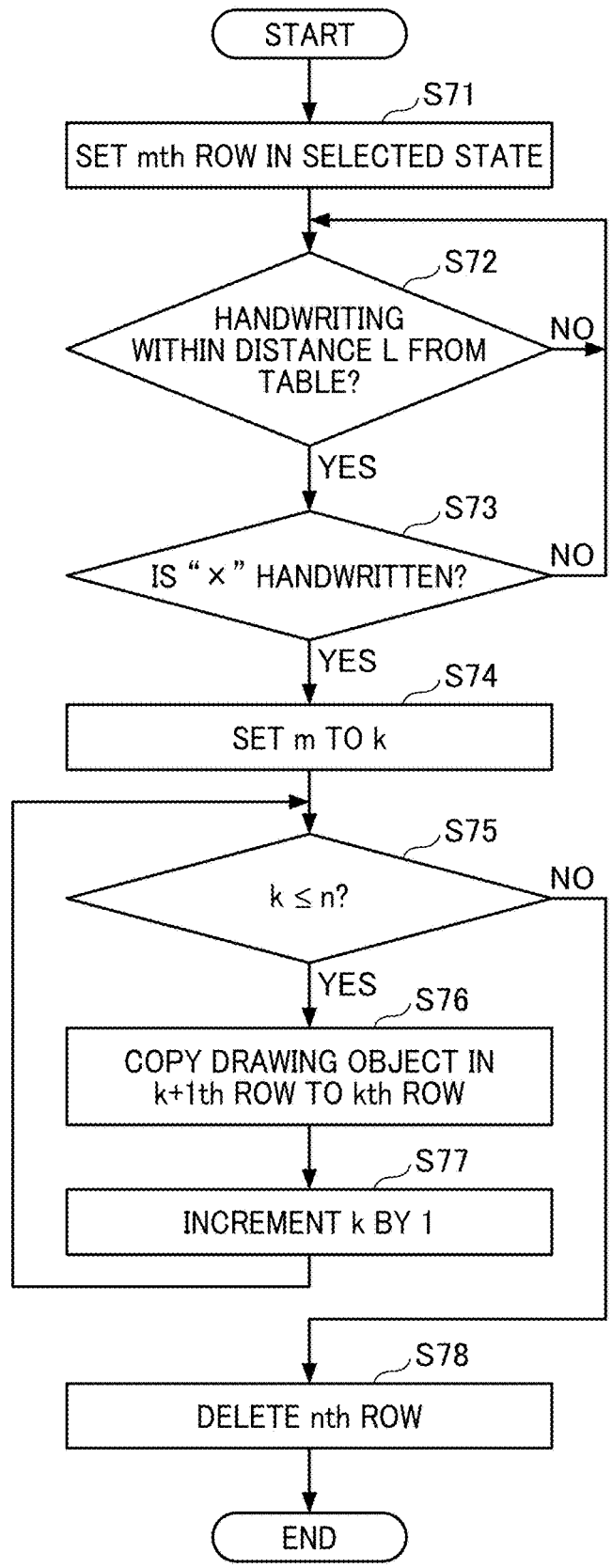
FIG. 25 is a flowchart illustrating an example of a process in which a display apparatus receives deletion of a row by the method illustrated in FIGS. 24A and 24B.

FIG. 25 is a flowchart illustrating an example of a process in which the display apparatus 2 receives deletion of a row by the method illustrated in FIGS. 24A and 24B. In the following description with reference to FIG. 25, the differences from FIG. 19 or 22 are described. In FIG. 25, the row is deleted by the handwritten data of the "x" mark, instead of a button.

First, steps S71 and S72 are the same as steps S41 and S42 in FIG. 19.

Next, the drawing object management unit 42 determines whether or not the mark 327 "x" has been handwritten (S73). The symbol recognition unit 48 recognizes the mark 327 "x."

Steps S74 to S78 are the same as steps S64 to S68 in FIG. 22.

That is, when the "x" mark is handwritten, the table object management unit 43 repeats copying the text of the (k+1)th row to the kth row from when k is m until k becomes n. After the repetition processing ends, the table object management unit 43 deletes the nth row.

In this way, the display apparatus 2 deletes a row, when the user instructs selection of a row by handwritten data and deletion of the row by handwriting a "x" mark.

FIGS. 26A and 26B are diagrams illustrating drawing object information before and after deletion of a row. FIG. 26A illustrates the drawing object information before the deletion, and FIG. 26B illustrates the drawing object information after the deletion. In the following description with reference to FIG. 26, the differences from FIG. 23 are described.

The drawing object information illustrated in FIG. 26A includes handwritten data having a drawing object ID "002" corresponding to a mark x. The number of rows of table object information table has decreased from n to n−1 in FIG. 26B. Since the mth row in FIG. 26A is deleted, the drawing object in the mth row in FIG. 26B is replaced with the contents of the (m+1)th row in FIG. 26A. Further, since the mark 327 "x" having the drawing object ID "002" is deleted, the information thereof are deleted from the drawing object information table.

Third Example of Deletion of Row

Figures 27A, 27B:
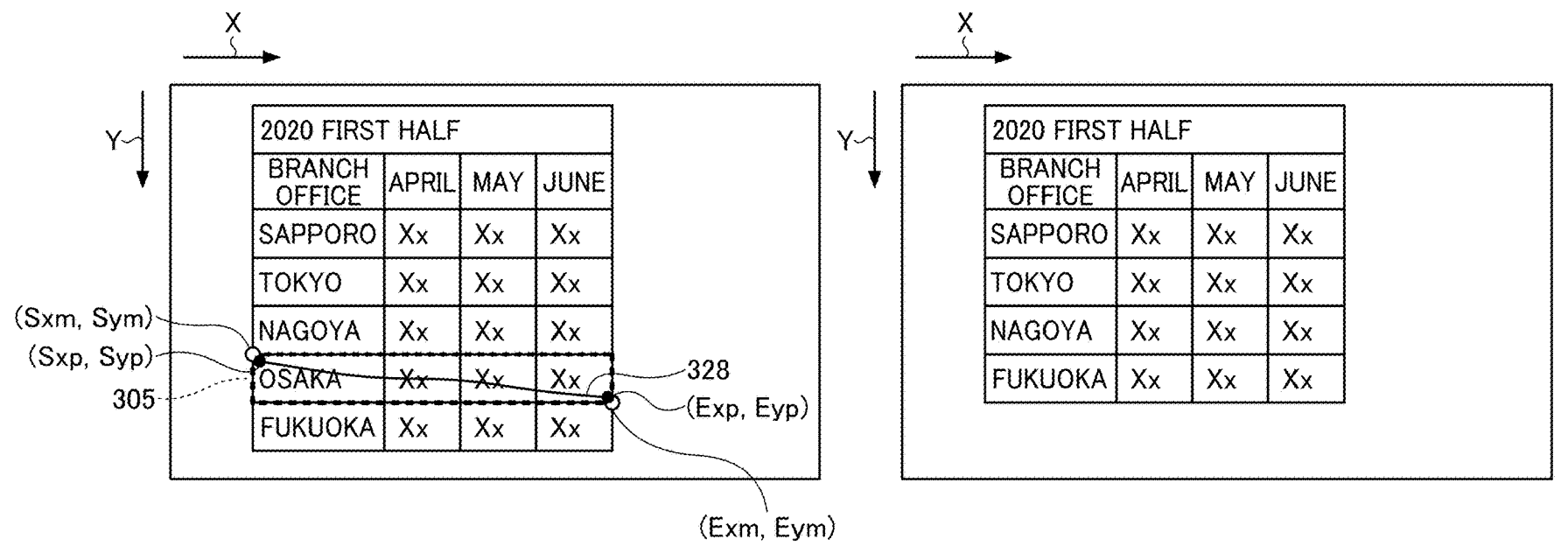

Next, with reference to FIGS. 27A and 27B, a third method for deleting a row will be described. FIGS. 27A and 27B are diagram illustrating a method for deleting a row from a table using handwritten data.

In FIG. 27A, the row of Osaka is in the selected state. Next, the user handwrites a diagonal line 328 (deleting handwritten data) in the row of Osaka. The table object management unit 43 determines whether or not the diagonal line 328 is superimposed on the selected row. When the handwritten diagonal line 328 is superimposed on the selected row, the table object management unit 43 determines the row corresponding to the written position. Determining that the diagonal line 328 is written on the selected row of Osaka, the table object management unit 43 deletes the row of Osaka and displays the row of Fukuoka subsequent to of Nagoya (FIG. 27B).

Figure 28:
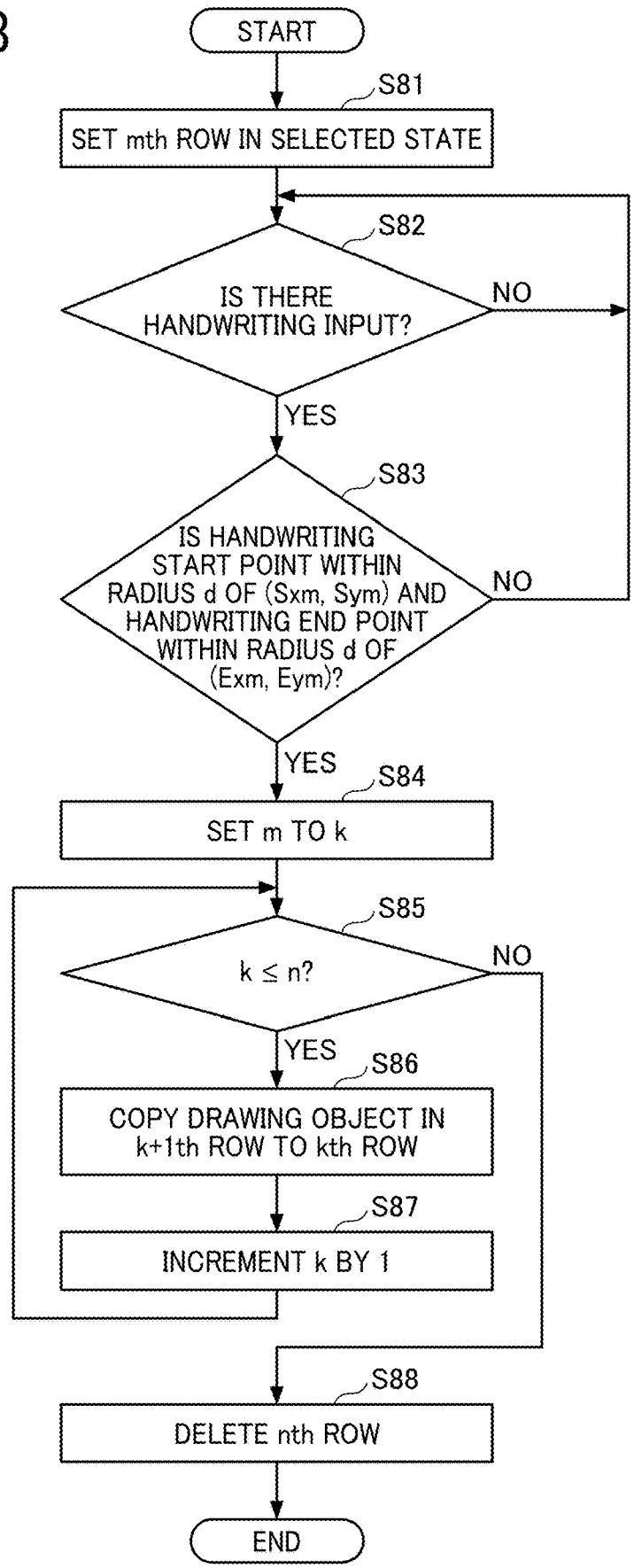
FIG. 28 is a flowchart illustrating an example of a process in which a display apparatus receives deletion of a row by the method illustrated in FIGS. 27A and 27B.

FIG. 28 is a flowchart illustrating an example of a process in which the display apparatus 2 receives deletion of a row by the method illustrated in FIGS. 27A and 27B. In the following description with reference to FIG. 28, the differences from FIG. 25 are described. In FIG. 28, the row is deleted by the handwritten data of the diagonal line 328 (see FIG. 27A) instead of the mark 327 "x."

First, the step S81 is similar to the step S71 in FIG. 25.

The table object management unit 43 determines whether or not handwritten data has been input (S82). That is, the table object management unit 43 may simply determine whether or not handwriting has been input.

Next, the table object management unit 43 determines whether or not the diagonal line 328 is handwritten on the mth row (S83). That is, the table object management unit 43 determines whether or not the start point (Sxp,Syp) of the handwritten data is within a radius d of the upper left coordinates (Sxm,Sym) of the mth row and the end point (Exp,Eyp) is within the radius d of the lower right coordinates (Exm,Eym) of the mth row. The radius d is a margin. The upper left coordinates and the lower right coordinates of the row represent two diagonal corners of the row.

Steps S84 to S88 are the same as steps S74 to S78 in FIG. 25. That is, when a diagonal line is handwritten on the mth row, the table object management unit 43 repeats copying the text of the (k+1)th row to the kth row from when k is m until k becomes n. When the repetition processing is completed, the nth row is deleted.

In this manner, the display apparatus 2 deletes a row when the user selects a row by handwritten data and instructs deletion of the row by the handwritten diagonal line 328. The handwritten data for instructing deletion is not limited to a diagonal line but may be parallel lines or a single line (strike-through).

Alternatively, the display apparatus 2 may select and delete a table element based on the handwritten data (e.g., the diagonal line) having a start point within a distance from one of two diagonal corners of the table element and an end point within the distance from the other of the two diagonal corners of the selected table.

FIGS. 29A and 29B are diagrams illustrating drawing object information before and after deletion of a row. FIG. 29A illustrates the drawing object information before the deletion, and FIG. 29B illustrates the drawing object information after the deletion. In the following description with reference to FIG. 29, the differences from FIG. 26 are described.

The drawing object information of FIGS. 29A and 29B are the same in format as that of FIGS. 26A and 26B. However, in FIG. 29A, the handwritten data having the drawing object ID "002" is the diagonal line 328. FIG. 29B may be the same as FIG. 26B.

First Example of Copying or Moving Row

Next, a method for copying or moving a row will be described with reference to FIGS. 30A to 30D. FIGS. 30A to 30D are diagrams illustrating a method for copying or moving a row.

Figure 30A:
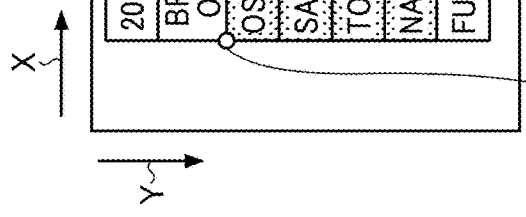
FIGS. 30A to 30D are diagrams illustrating a method for copying or moving a row from a table on a display, according to one embodiment.

In FIG. 30A, the row of Osaka is in the selected state. The user operates the input device 291 to drag the row of Osaka to the row of Sapporo in the table. The table object management unit 43 detects that contact coordinates (xm',ym') of the tip of the input device 291 overlap the row of the Sapporo. That is, the table object management unit 43 detects whether the contact coordinates (xm',ym') is within the range from upper left coordinates (Sxm',Sym') to lower right coordinates (Exm',Eym') of the row of Sapporo in FIG. 30A. As a result, the preview data generating unit generates and displays an image of the table (FIG. 30B) in which the row of Osaka has moved to the position where the row of Sapporo has been located in FIG. 30A. The term "preview" refers to simulating an operation and presenting the result, for confirmation, on a screen before actually performing any output in a computer or the like.

Figure 30B:
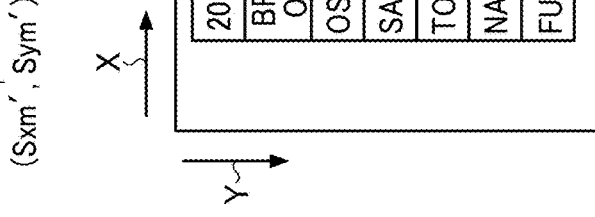
Figure 30C:
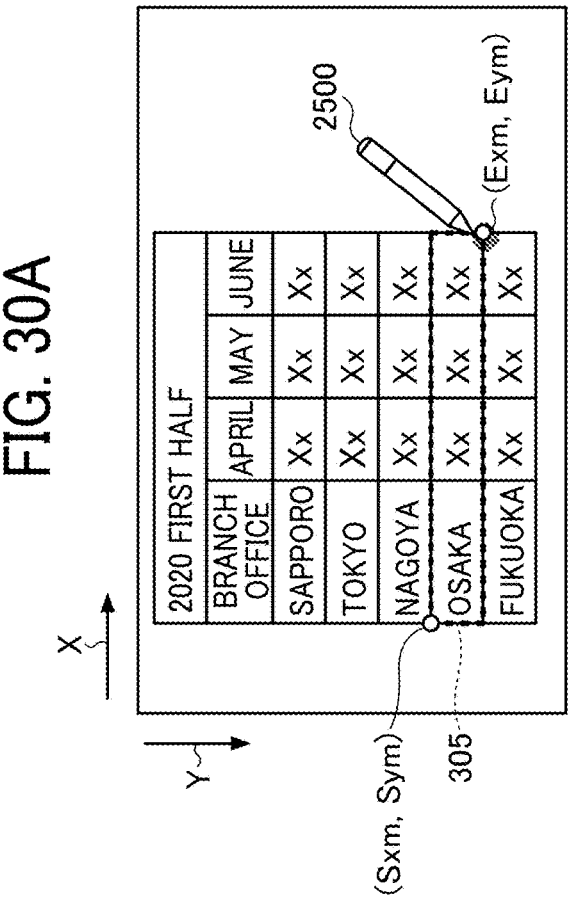

When the user keeps the input device 291 in contact with the screen for a predetermined time t seconds elapses from the state illustrated in FIG. 30B, in which the preview image is displayed, the table object management unit 43 generates and displays a table in which the character string of the row of Osaka is copied to the row of Sapporo (FIG. 30C). Thus, the rows of the Sapporo are deleted by overwriting.

Figure 30D:
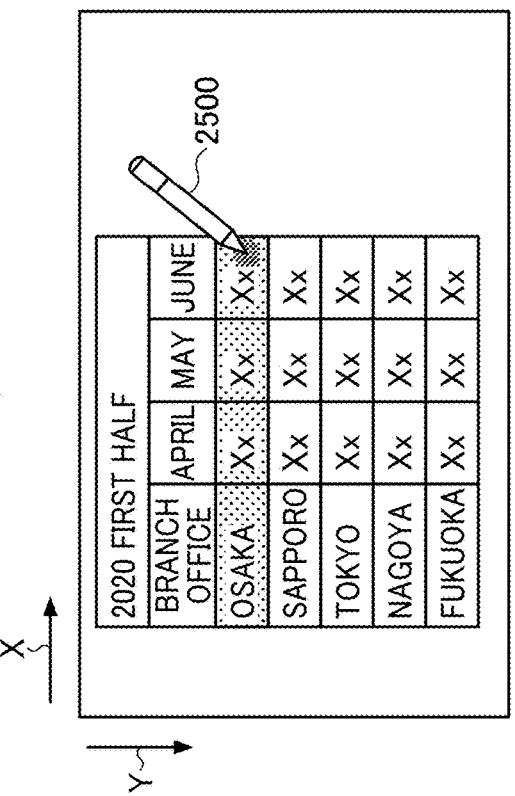

On the other hand, the user may drop the touching (move the input device 291 away from the screen) before the predetermined time t seconds elapses in the state where the preview image of FIG. 30B is displayed. In this case, the table object management unit 43 displays a table in which the row of Osaka has moved to the position where the row of Sapporo has been. The row of the Sapporo to the row of the Nagoya are moved down by one row. In addition, the preview image generation unit 49 hides the preview image (FIG. 30D).

Figure 31:
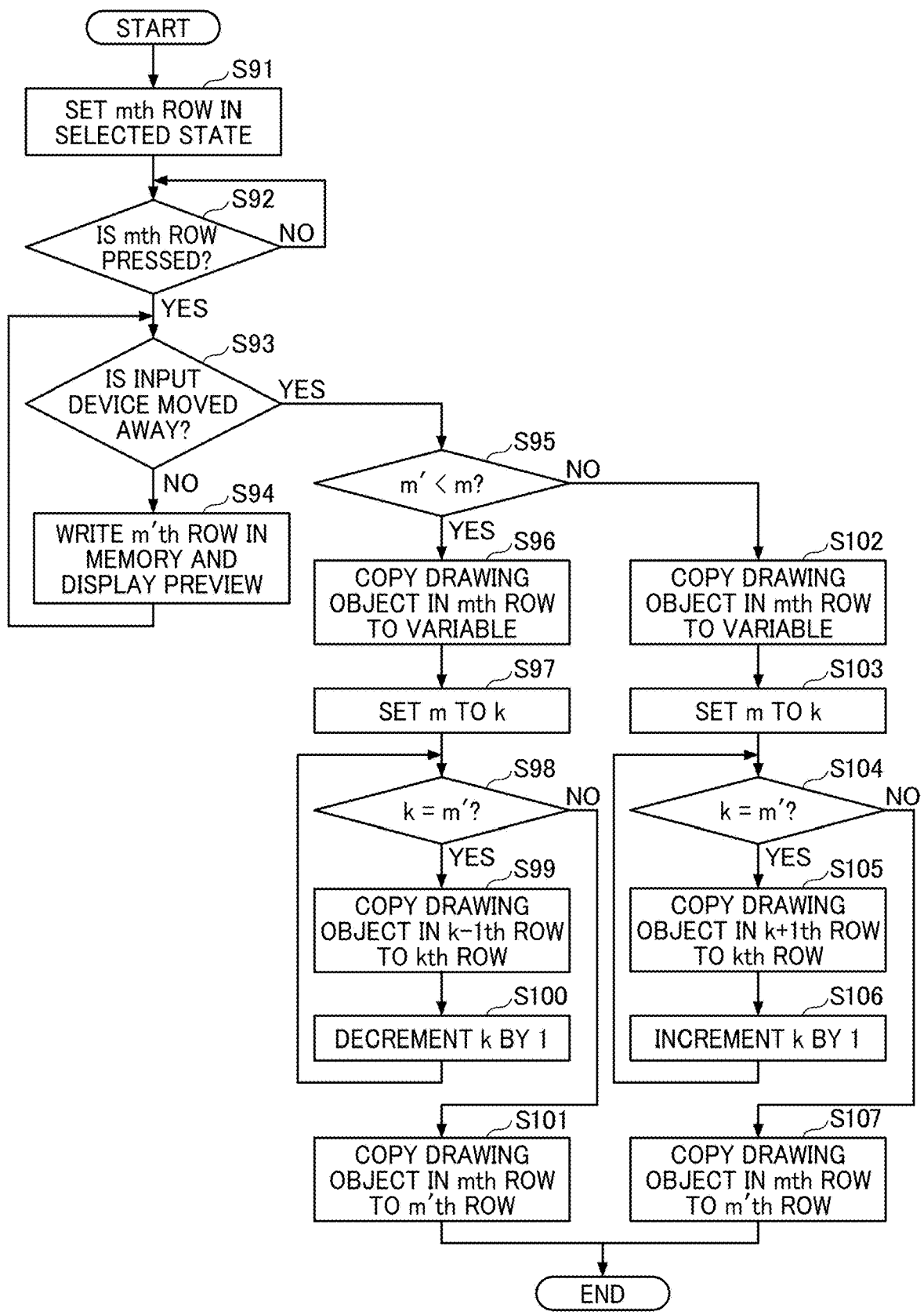
FIG. 31 is a flowchart illustrating an example of a process in which a display apparatus receives moving a row by the method illustrated in FIGS. 30A to 30D.

FIG. 31 is a flowchart illustrating an example of a process in which the display apparatus 2 receives moving a row by the method illustrated in FIGS. 30A to 30D.

The table object management unit 43 sets the mth row (an example of a first row or selected row) in the selected state (S91).

The table object management unit 43 determines whether or not the mth row is pressed by the input device 291 based on the contact coordinates of the input device 291 detected by the contact position detection unit 40 (S92). When the user moves the input device 291 without releasing the input device 291 from the screen (No in S93), the table object management unit 43 detects the movement based on the contact coordinates of the input device 291 detected by the contact position detection unit 40.

When the input device 291 is dragged from the selected mth row to an m'th row (an example of a second row or different row), the table object management unit 43 writes contact coordinates (xm',ym') illustrated in FIG. 30B in the memory, and the preview image generation unit 49 displays a preview image (S94). The preview image is generated by the same processing as processing described later with reference to FIG. 31. In the case of columns, an mth column and an m'th column are examples of a first column and a second column, respectively.

When the input device 291 is separated from the screen (Yes in S93), the table object management unit 43 determines whether or not the contact coordinates (xm',ym') are smaller than coordinates of the mth row in the selected state (S95).

When the contact coordinates (xm',ym') are smaller than the coordinates of the mth row in the selected state (Yes in S95), that is, the contact coordinates (xm',ym') are moves upward, the table object management unit 43 copies the text in the mth row to a variable (S96). The term "variable" means a container of data. This is because the mth row is overwritten.

Then, the table object management unit 43 sets m to the variable k (S97).

The table object management unit 43 determines whether or not an end condition (k=m is false) is satisfied (S98). This end condition is to determine whether or not copying from the mth row to the m'th row has ended.

When the end condition is not satisfied (Yes in S98), the table object management unit 43 copies the text of the (k−1)th row to the kth row (S99).

The table object management unit 43 decrements k by one and repeats the processing from step S98 (S100).

When the end condition is satisfied (No in S98), the table object management unit 43 copies the text of the mth row, which has been put in the variable, to the m'th row (S101).

When the contact coordinates (xm',ym') are larger than coordinates of the mth row in the selected state, that is, the contact coordinates (xm',ym') are moved downward, the table object management unit 43 copies the text in the mth row to the variable (S102). The term "variable" means a container of data. This is because the mth row is overwritten.

Then, the table object management unit 43 sets m to the variable k (S103).

The table object management unit 43 determines whether or not the end condition (k=m' is false) is satisfied (S104).

When the end condition is not satisfied (Yes in S104), the table object management unit 43 copies the text in the (k+1)th row to the kth row (S105).

The table object management unit 43 increments k by one (S106) and repeats the processing from step S104.

When the end condition is satisfied (No in S104), the table object management unit 43 copies the text of the mth row, which has been put in the variable, to the m'th row (S107).

In this way, the display apparatus 2 selects and moves a row, when the user instructs to select the row and move the row by dragging with the input device 291.

FIGS. 32A and 32B are tables of table object information before and after moving a row. FIG. 32A illustrates the table object information before moving a row, and FIG. 32B illustrates the table object information after moving the row. The table object information in FIGS. 32A 32B includes a column "text" compared to that illustrated in FIGS. 23A and 23B.

In FIG. 32A, drawing objects T1 to Tn in the column "text" are stored in the respective rows. The text Tm in FIG. 32A is moved to the first row in FIG. 32B, and the texts T1 to Tm−1 are moved down by one row.

Second Example of Moving Row

Figure 33B:
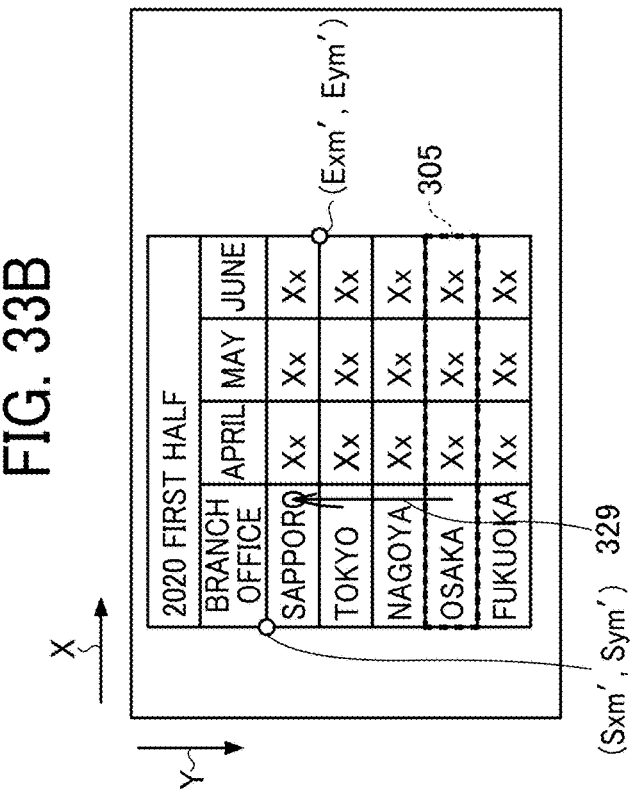
FIGS. 33A to 33C are diagram illustrating an example of a method for moving a row from a table using handwritten data on the display apparatus according to one embodiment.
Figure 33A:
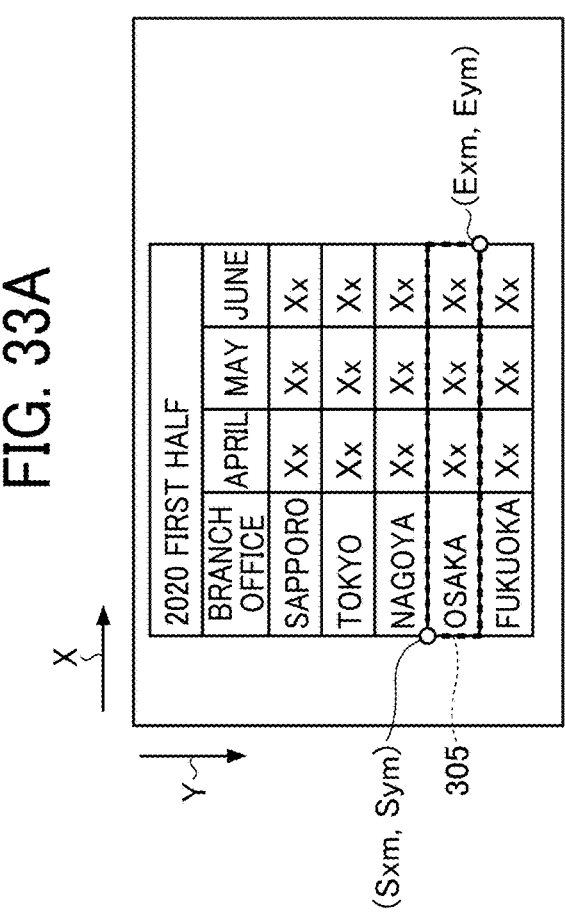
Figure 33C:
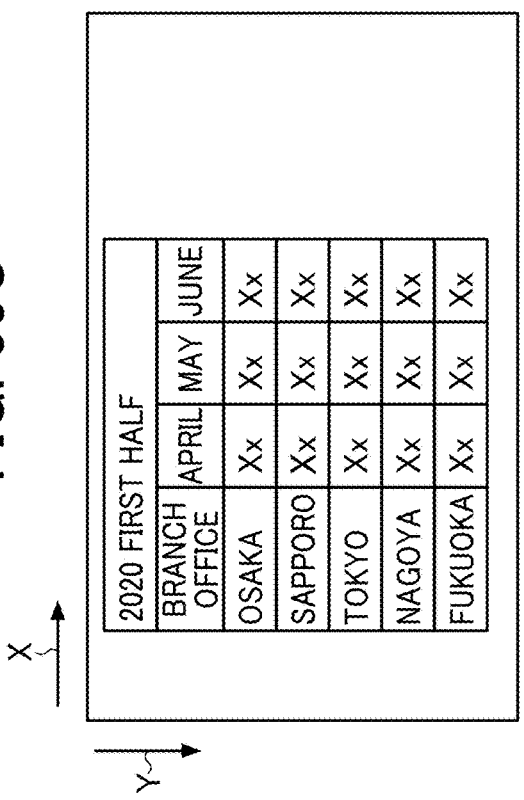

Next, with reference to FIGS. 33A to 33C, a description will be given of a second method for moving a row by handwritten data. FIGS. 33A to 33C are diagram illustrating a method for moving a row from a table using handwritten data.

In FIG. 33A, the row of Osaka is in the selected state. The user handwrites an arrow 329 extending from the row of Osaka to the row of Sapporo (FIG. 33B). When determining that the start point of the handwritten data (the arrow 329) is in the selected row of the table, the table object management unit 43 determines the row in which the end point of the handwritten data (the arrow 329) is written. For example, when it is determined that the start point is in the row of Osaka and the end point is in the row of Sapporo, the table object management unit 43 generates and displays a table in which the row of Osaka is moved to the position of row of Sapporo (FIG. 33C).

Figure 34:
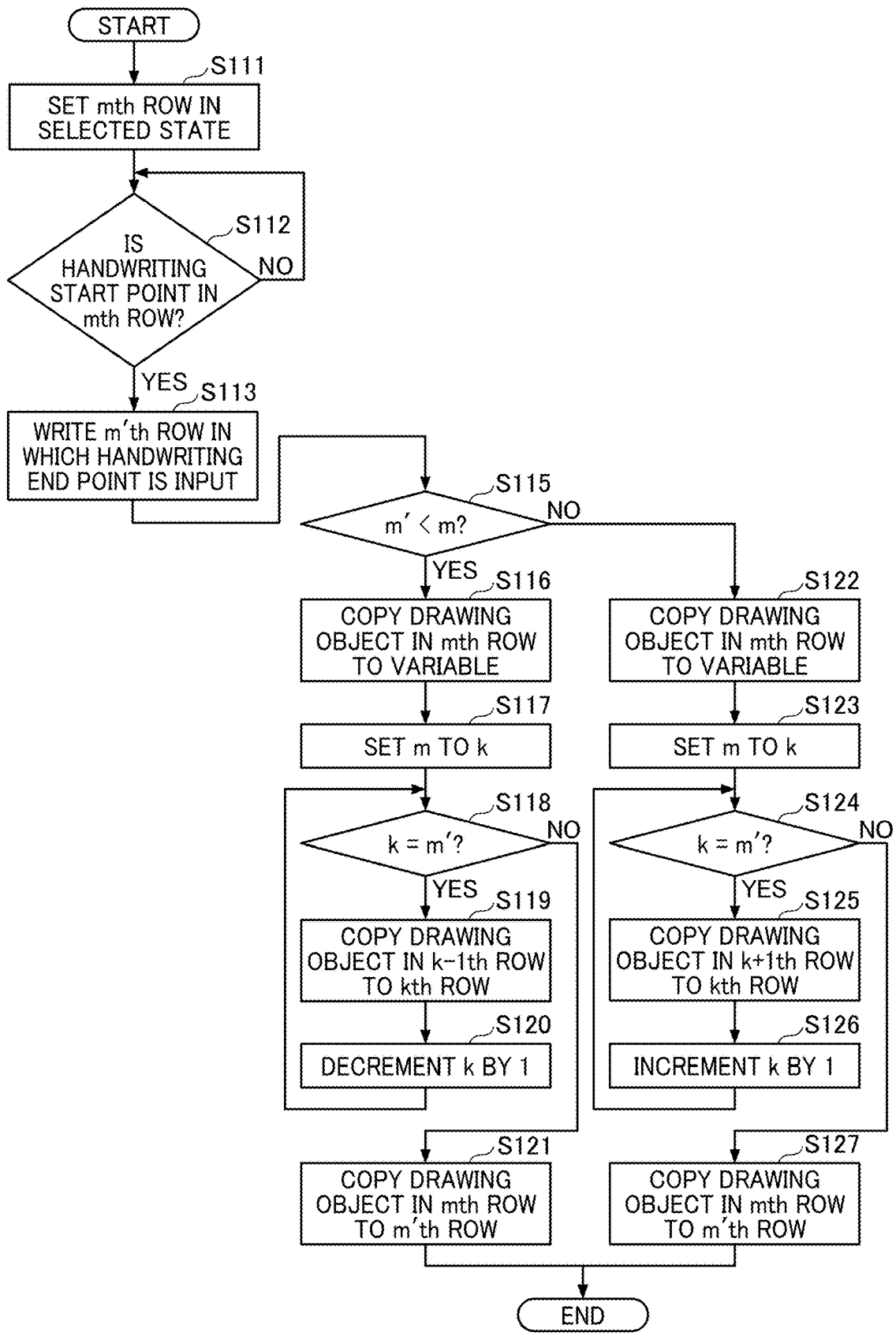
FIG. 34 is a flowchart illustrating an example of a process in which a display apparatus receives moving of a row by the method illustrated in FIGS. 33A to 33C.

FIG. 34 is a flowchart illustrating an example of a process in which the display apparatus 2 receives moving of a row by the method illustrated in FIGS. 33A to 33C. In the following description with reference to FIG. 34, the differences from FIG. 31 are described. In FIG. 34, the row is moved not by dragging but by the handwritten data of the arrow 329.

Therefore, the table object management unit 43 determines whether or not the start point of the handwritten data (the arrow 329) is in the mth row (S112). The table object management unit 43 may determine whether or not the shape is an arrow.

When handwriting is performed in the mth row, the table object management unit 43 writes, in the memory, the m'th row having the end point of the handwritten arrow 329 (S113). The table object management unit 43 may determine whether the end point is inside the table.

The subsequent process from S115 to S127 is similar to that from S95 to S107 in FIG. 31.

In this way, the display apparatus 2 selects and moves a row, when the user instructs to select a row and move the row by handwriting the arrow 329.

FIGS. 35A and 35B are tables of drawing object information before and after moving a row. FIG. 35A illustrates the drawing object information before moving a row, and FIG. 35B illustrates the drawing object information after moving the row. In the description referring to FIGS. 35A and 35B, for simplicity, the main differences from FIGS. 32A and 32B are mainly described.

The drawing object information illustrated in FIG. 35A includes handwritten data having the drawing object ID "002" corresponding to the arrow 329. As illustrated in FIG. 35B, the text Tm of FIG. 35A moves to the first row of FIG. 35B, and the texts T1 to Tm−1 move down by one row.

Further, since the arrow 329 having the drawing object ID "002" is deleted, the information thereof is also deleted from the drawing object information table.

Third Example of Moving Row

Figure 36A:
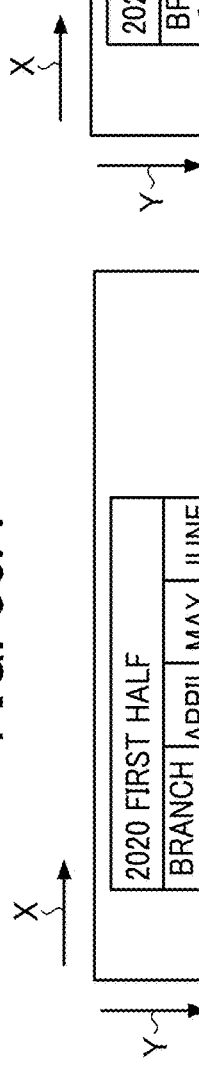
FIGS. 36A to 36C are diagram illustrating another example of the method for moving a row from a table using handwritten data according to one embodiment.
Figure 36B:
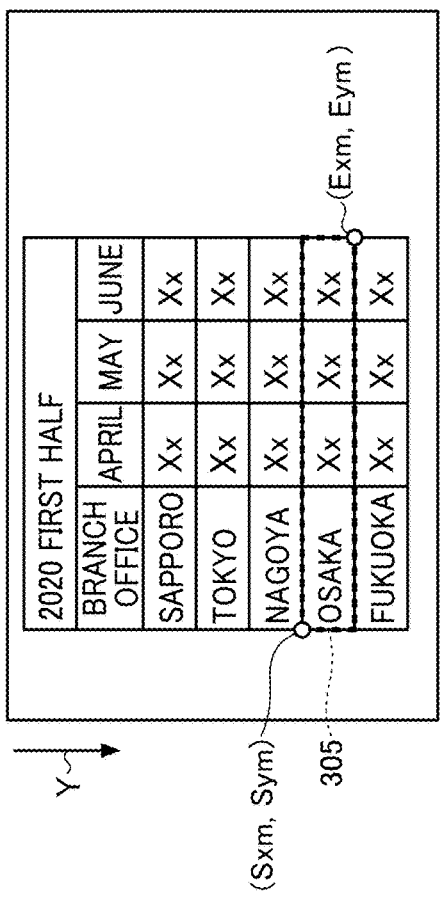
Figure 36C:
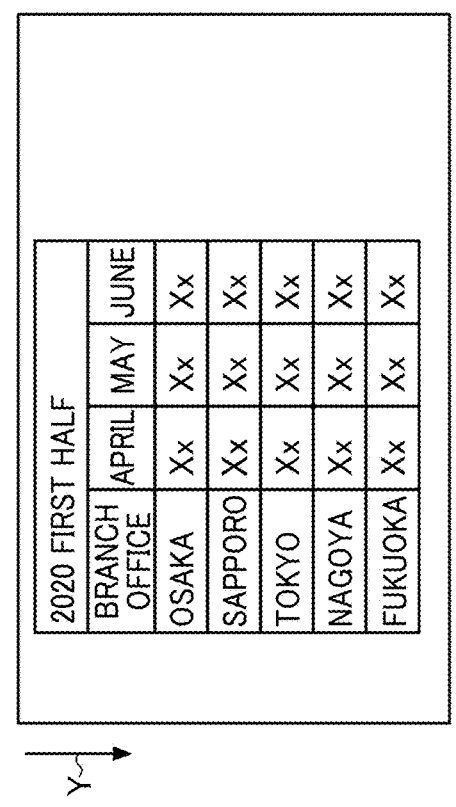

Next, with reference to FIGS. 36A to 36C, a description will be given of a third method for moving a row by handwritten data. FIGS. 36A to 36C are diagram illustrating a method for moving a row from a table using handwritten data.

In FIG. 36A, the row of Osaka is in the selected state. The user handwrites an arrow 330 from next to the row of Osaka toward the row of Sapporo (FIG. 36B). When determining that the start point of the handwritten data (the arrow 330) is in the selected row of the table, the table object management unit 43 determines the row in which the end point of the handwritten data (the arrow 330) is written. For example, when it is determined that the start point is in the row of Osaka and the end point is in the row of Sapporo, the table object management unit 43 generates and displays a table in which the row of Osaka is moved to the position of row of Sapporo (FIG. 36C).

Figure 37:
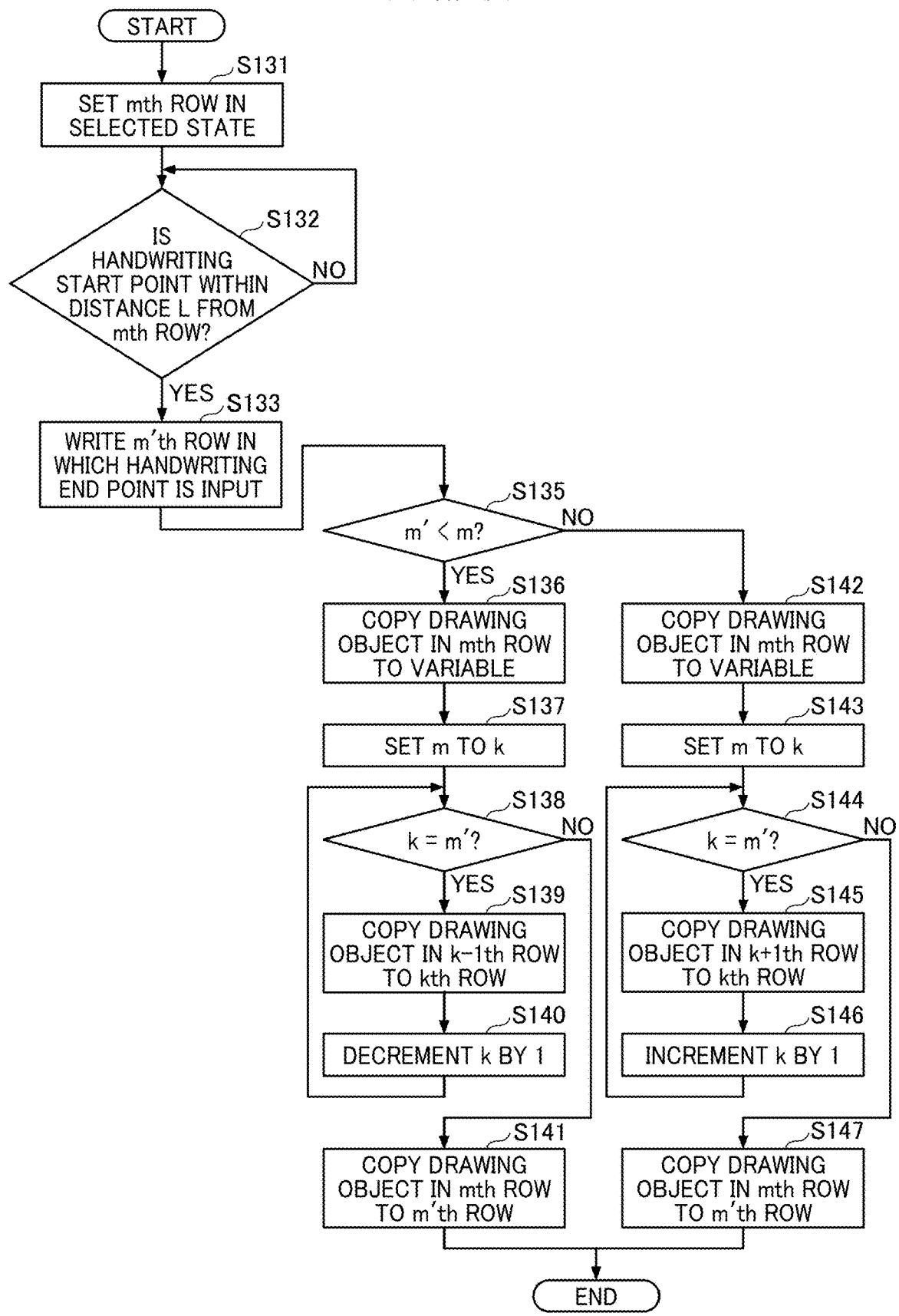
FIG. 37 is a flowchart illustrating an example of a process in which a display apparatus receives moving of a row by the method illustrated in FIGS. 36A to 36C.

FIG. 37 is a flowchart illustrating an example of a process in which the display apparatus 2 receives moving of a row by the method illustrated in FIGS. 36A to 36C. In the following description with reference to FIG. 37, the differences from FIG. 34 are described. In FIG. 37, the row is moved by handwritten data of the arrow 330 outside the table.

Therefore, the table object management unit 43 determines whether or not the start point of the handwritten data (the arrow 330 in FIG. 36B) corresponds the mth row and the handwriting has been performed within the range L from the table (S132). The table object management unit 43 may determine whether or not the shape is an arrow.

Therefore, when the handwritten data (the arrow 330 in FIG. 36B) is input adjacent to the mth row and within the range L from the table, the table object management unit 43 writes, in a memory, the m'th row corresponding to the end point of the arrow 330 (S133). The table object management unit 43 may determine whether or not the end point of the arrow is within the distance L from the table.

Subsequent process from S135 to S147 is similar to that from S115 to S127 in FIG. 34.

In this way, the display apparatus 2 selects and moves a row, when the user instructs to select the row and move the row by handwriting an arrow.

FIGS. 38A and 38B are tables of drawing object information before and after moving a row. In the following description with reference to FIGS. 38A and 38B, the differences from FIGS. 35A and 35B are described. FIGS. 38A and 38B have the same format as FIGS. 35A and 35B. In FIG. 38A, the handwritten data of the arrow 329 written outside the table is registered with the drawing object ID "002." FIG. 38B may be the same as FIG. 35B.

Division of Table

Figures 39A, 39B, 39C:
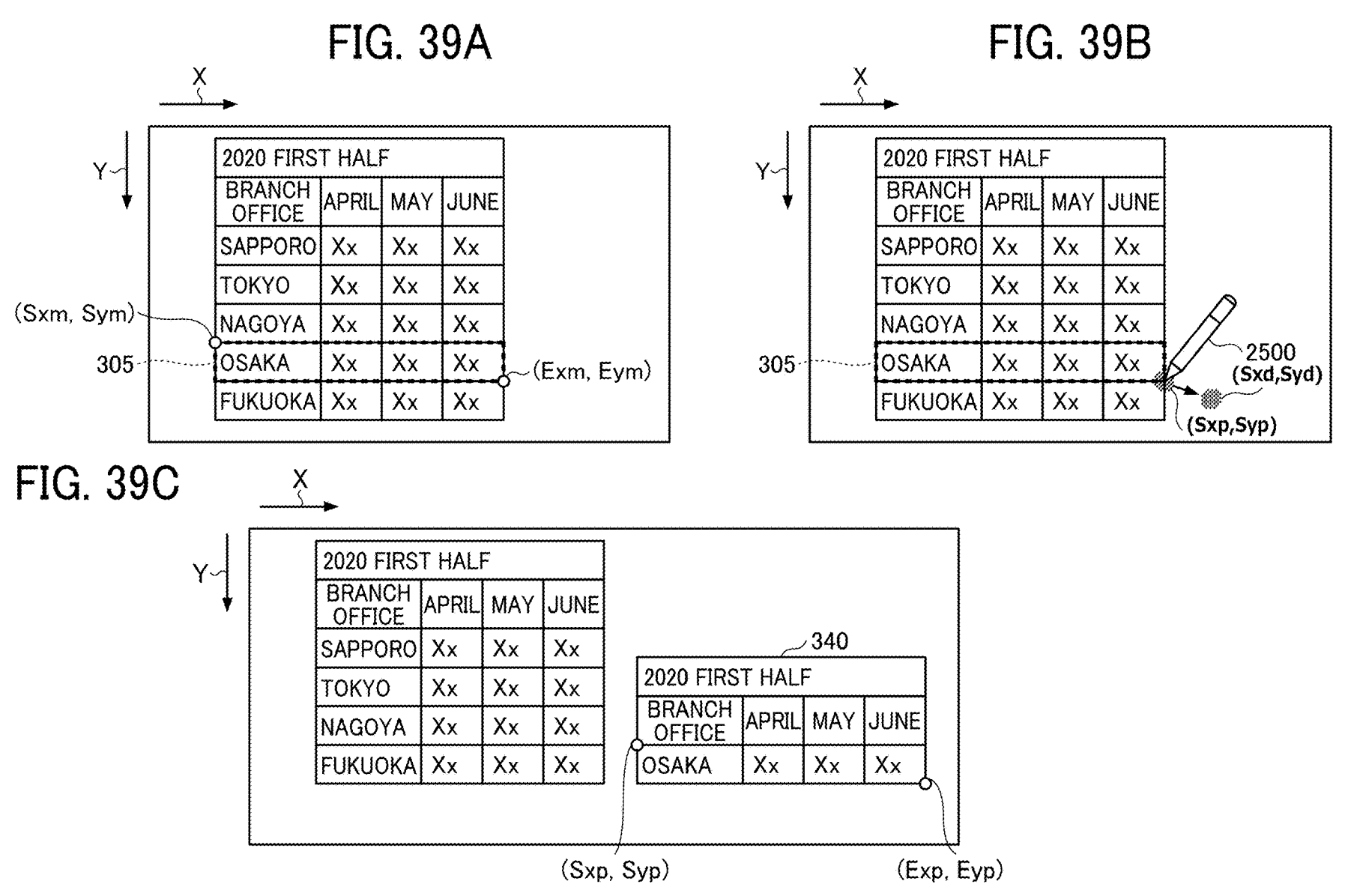

Next, a method for the user to divide the table will be described with reference to FIGS. 39A to 39C. FIGS. 39A to 39C are diagrams illustrating an example of the method for dividing a table.

In FIG. 39A, the row of Osaka is in the selected state. The user moves, by drag-and-drop, the row of Osaka to the outside of the table using the input device 291 (FIG. 39B).

The table object management unit 43 generates a second table 340 in which the row of Osaka inherits the title row, at the dropped coordinates. The "title row" includes at least the first row of the table (having the text "2020 first half"), and the "title row" has a color different from that of other rows. The table object management unit 43 deletes the row of Osaka from the original table (FIG. 39C). In the case where a selected column is moved by drag-and-drop, a second table in which a title column is inherited to the selected column is generated.

Figure 40:
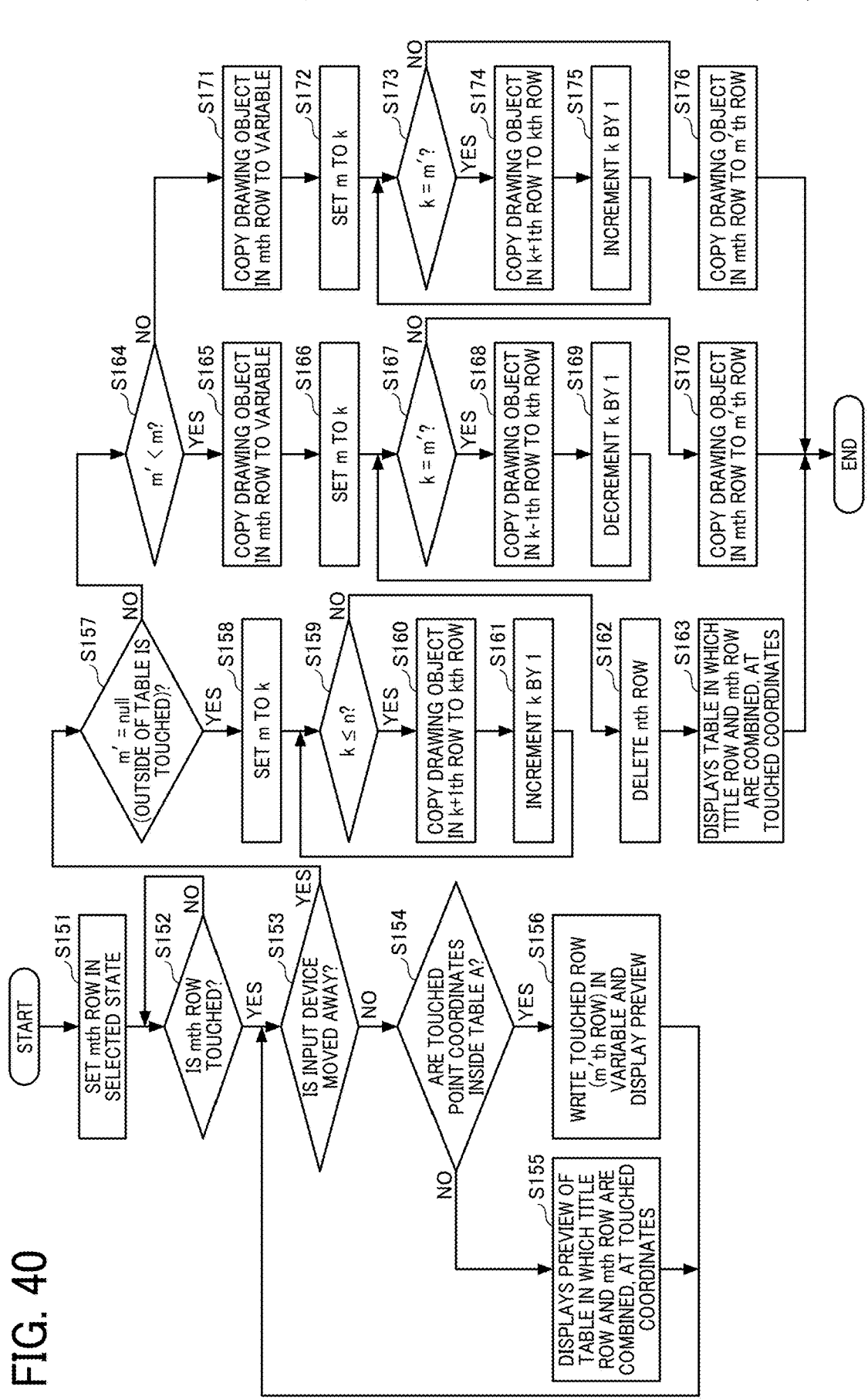
FIG. 40 is a flowchart illustrating an example of a process in which a display apparatus receives an operation of dividing a table and divides the table by the method illustrated in FIGS. 39A to 39C.

FIG. 40 is a flowchart illustrating an example of a process in which the display apparatus 2 receives an instruction of dividing a table and divides the table.

First, the object selection unit 44 sets the mth row in a selected state (S151).

Next, the table object management unit 43 determines whether or not the mth row is touched (S152). When the user moves the input device 291 without separating the input device 291 from the screen (No in S153), the table object management unit 43 determines whether or not the contact coordinates are within the table (S154).

When the contact coordinates are inside the table, the table object management unit 43 determines that an operation of moving or copying is input. The table object management unit 43 holds the m' row as a variable, and the preview image generation unit 49 displays a preview image (S156). This preview image is the same as that in the step S94 in FIG. 31.

When the user drags the input device 291 outside the table, the preview image generation unit 49 displays a preview image of a table in which the title row is combined with the mth row, at the coordinates touched by the tip of the input device 291 (S155). In the preview image, a table is obtained by combining the title row and the mth row of the table is displayed (S155). The title row is predetermined, for example, as the first row. Alternatively, a colored row may be determined to be a title row. In this embodiment, title rows are the row having the text "2020 first half" and the row having the texts "branch office, "April," "May," and June."

When the user releases the input device 291 from the screen, the table object management unit 43 determines whether m' is null (S157). In S157, "null" represents that m' is outside the table.

When the user touches the outside of the table with the input device 291 and moves the input device 291 away from the screen, the rows divided into the second table 340 is deleted from the original table. Therefore, the process of steps S158 to S162 is the same as that of steps S64 to S68 in FIG. 22.

Then, the table object management unit 43 displays the second table 340 in which the title row and the mth row of the original table are combined, at the coordinates touched last by the input device 291 (S163).

When the user touches the inside of the table, it is determined that the user has inputted an operation of moving the row. Therefore, the process of steps S164 to S176 may be the same as that of steps S135 to S147 in FIG. 37.

In this way, the display apparatus 2 divides the table when the user instructs to divide the table by selecting a row and dragging the row outside the table.

FIGS. 41A and 41B are diagrams illustrating drawing object information before and after dividing a table. FIG. 41A illustrates object information before the division, and FIG. 41B illustrates object information after the division. Since the second table 340 is newly generated by the division, the drawing object ID of the last row is changed from 001 to 002 in FIG. 40B.

Since the mth row among the rows having row object IDs "001" to "00n" in FIG. 41A is divided, the row having the row object ID "00m" corresponds to the drawing object having the drawing object ID "002" in FIG. 41B. In addition, the (m+1)th row and subsequent rows are moved up by one row.

Further, the row of the drawing object ID "002" has the row object ID "001." This is because a row object ID is assigned from the first row in the second table 340 after division. In the divided table, the start point coordinates and the end point coordinates are also renewed.

As described above, the display apparatus 2 according to the present embodiment can perform editing such as addition, movement, deletion, or division of a row or a column with handwritten data. Thus, operability improves.

Although the display apparatus 2 according to the present embodiment is described as that having a large touch panel, the display apparatus 2 is not limited thereto. In one example, the display apparatus 2 may not be provided with the touch panel, but may be connected with the external touch panel to control display of the touch panel. In another example, the display apparatus 2 may operate in cooperation with an external server that stores various information to be used by the display apparatus 2.

Embodiment 2

In embodiment 2, another example of the configuration of a display system will be described, which performs the above-described editing.

A description is given below of an example of the configuration of the display system.

Figure 42:
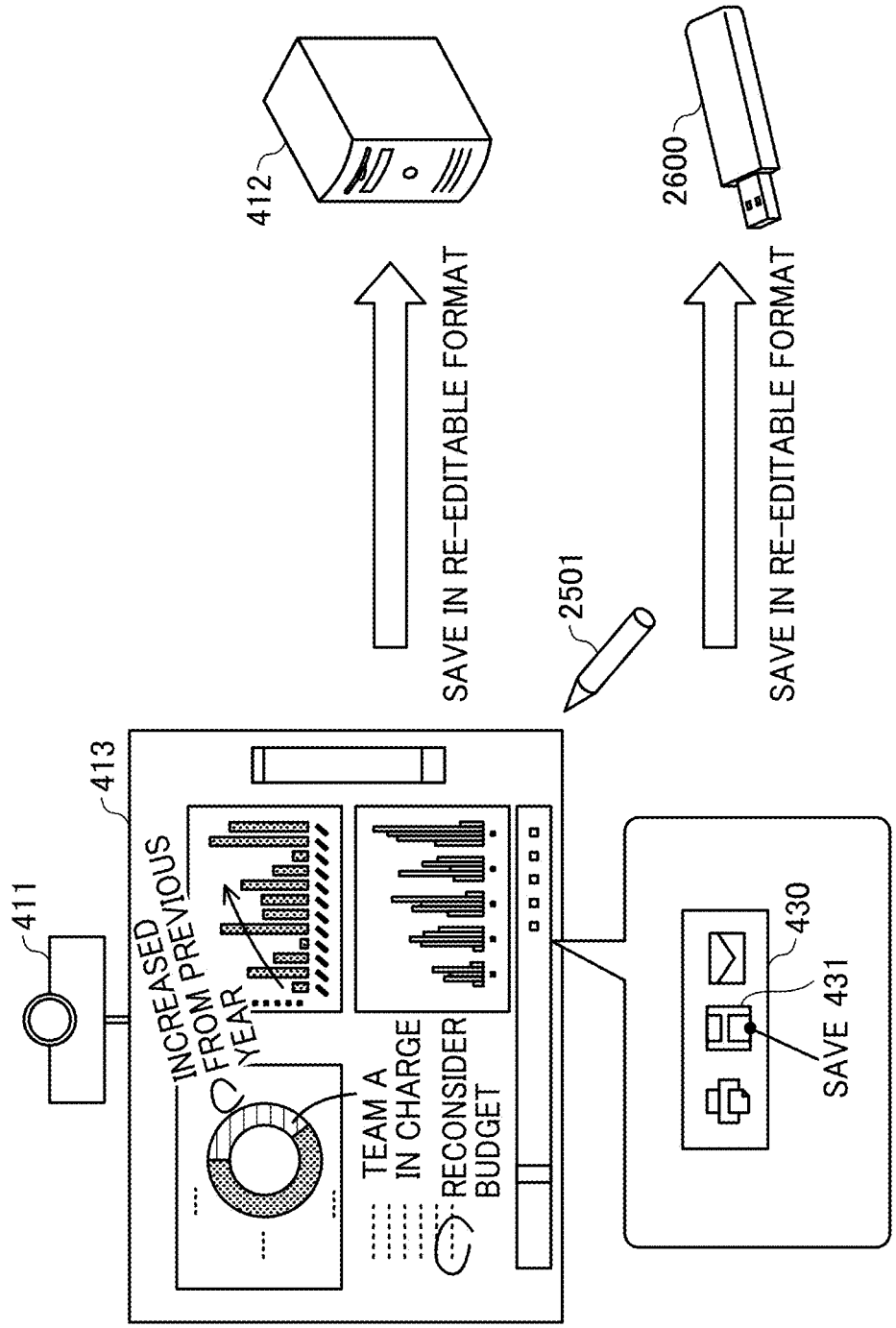
FIG. 42 is a diagram illustrating a configuration of a display apparatus according to another embodiment.

FIG. 42 is a diagram illustrating an example of the configuration of a display system. The display system includes a projector 411, a whiteboard 413, and a server 412, which are communicable via a network. In FIG. 42, the projector 411 is installed on the upper face of the standard whiteboard 413. The projector 411 mainly operates as the display apparatus 2 described above. The projector 411 is a general-purpose projector, but installed with software that causes the projector 411 to function as all of the functional units illustrated in FIG. 5, to perform any one of the above-described editing. The "standard whiteboard" (the whiteboard 413) is not a flat panel display integral with a touch panel, but is a whiteboard to which a user directly handwrites information with a marker. Note that the whiteboard may be a blackboard, and may be simply a plane having an area large enough to project an image.

The projector 411 employs an ultra short-throw optical system and projects an image (video) with reduced distortion from a distance of about 10 cm to the whiteboard 413. This video may be transmitted from a PC connected wirelessly or by wire, or may be stored in the projector 411.

The user performs handwriting on the whiteboard 413 using a dedicated electronic pen 2501. The electronic pen 2501 includes a light-emitting element, for example, at a tip thereof. When a user presses the electronic pen 2501 against the whiteboard 413 for handwriting, a switch is turned on, and the light-emitting portion emits light. The wavelength of the light of the light-emitting element is near-infrared or infrared, which is invisible to the user's eyes. The projector 411 includes a camera. The projector 411 captures, with the camera, an image of the light-emitting element, analyzes the image, and determines the direction of the electronic pen 2501. Further, the electronic pen 2501 emits a sound wave in addition to the light, and the projector 411 calculates a distance based on an arrival time of the sound wave. The projector 411 determines the position of the electronic pen 2501 based on the direction and the distance. Handwritten data is drawn (projected) at the position of the electronic pen 2501.

The projector 411 projects a menu 430. When the user presses a button of the menu 430 with the electronic pen 2501, the projector 411 determines the pressed button based on the position of the electronic pen 2501 and the ON signal of the switch. For example, when a save button 431 is pressed, handwritten data (coordinate point sequence) input by the user is saved in the projector 411. The projector 411 stores the handwritten information in a predetermined server 412, the USB memory 2600, or the like. Handwritten information is stored for each page. Handwritten information is stored not as image data but as coordinates, and the user can re-edit the handwritten information. However, in the present embodiment, an operation command can be called by handwriting, and the menu 430 does not have to be displayed.

Embodiment 3

A description is given below of another example of the configuration of the display system.

Figure 43:
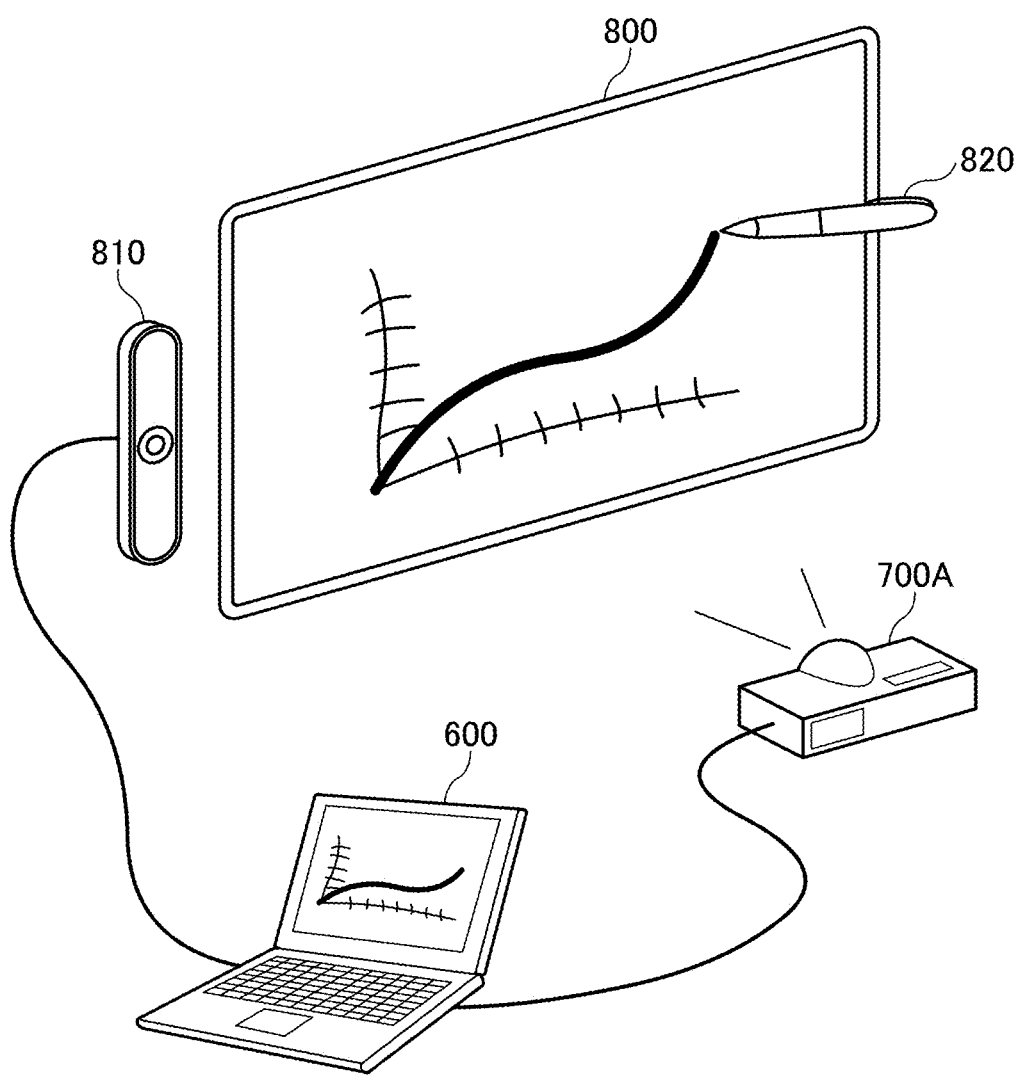
FIG. 43 is a diagram illustrating a configuration of a display apparatus according to another embodiment.

FIG. 43 is a diagram illustrating another example of the configuration of the display system according to embodiments of the present disclosure. In the example illustrated FIG. 43, the display system includes a terminal 600 (e.g., a PC), an image projector 700A, and a pen motion detector 810.

The terminal 600 is wired to the image projector 700A and the pen motion detector 810. The image projector 700A projects an image onto a screen 800 according to data input from the terminal 600.

The pen motion detector 810 communicates with an electronic pen 820 to detect a motion of the electronic pen 820 in the vicinity of the screen 800. More specifically, the pen motion detector 810 detects coordinate information indicating the position pointed by the electronic pen 820 on the screen 800 and transmits the coordinates to the terminal 600. The detection method may be similar to that of FIG. 42.

Based on the coordinate information received from the pen motion detector 810, the terminal 600 generates image data based on handwritten data input by the electronic pen 820 and causes the image projector 700A to project, on the screen 800, an image based on the handwritten data.

The terminal 600 generates data of a superimposed image in which an image based on handwritten data input by the electronic pen 820 is superimposed on the background image projected by the image projector 700A.

Embodiment 4

A description is given below of another example of the configuration of the display system.

Figure 44:
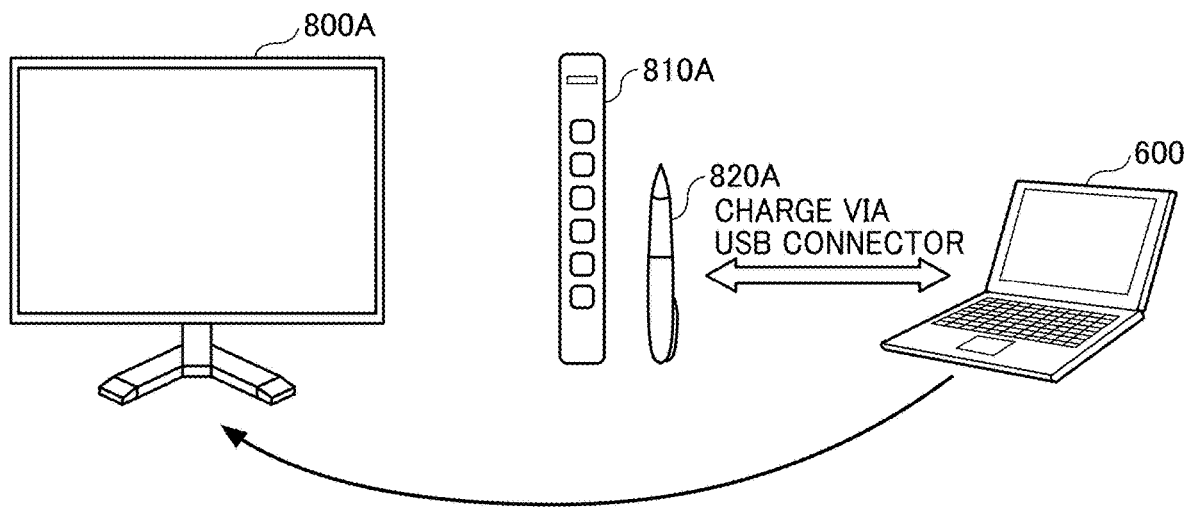
FIG. 44 is a diagram illustrating a configuration of a display apparatus according to another embodiment.

FIG. 44 is a diagram illustrating another example of the configuration of the display system. In the example illustrated FIG. 44, the display system includes the terminal 600, a display 800A, and a pen motion detector 810A.

The pen motion detector 810A is disposed in the vicinity of the display 800A. The pen motion detector 810A detects coordinate information indicating a position pointed by an electronic pen 820A on the display 800A and transmits the coordinate information to the terminal 600. The coordinate information may be detected in a method similar to that of FIG. 42. In the example illustrated FIG. 44, the electronic pen 820A is charged from the terminal 600 via a USB connector.

Based on the coordinate information received from the pen motion detector 810, the terminal 600 generates image data of handwritten data input by the electronic pen 820A and displays an image based on the handwritten data on the display 800A.

Embodiment 5

A description is given below of another example of the configuration of the display system.

Figure 45:
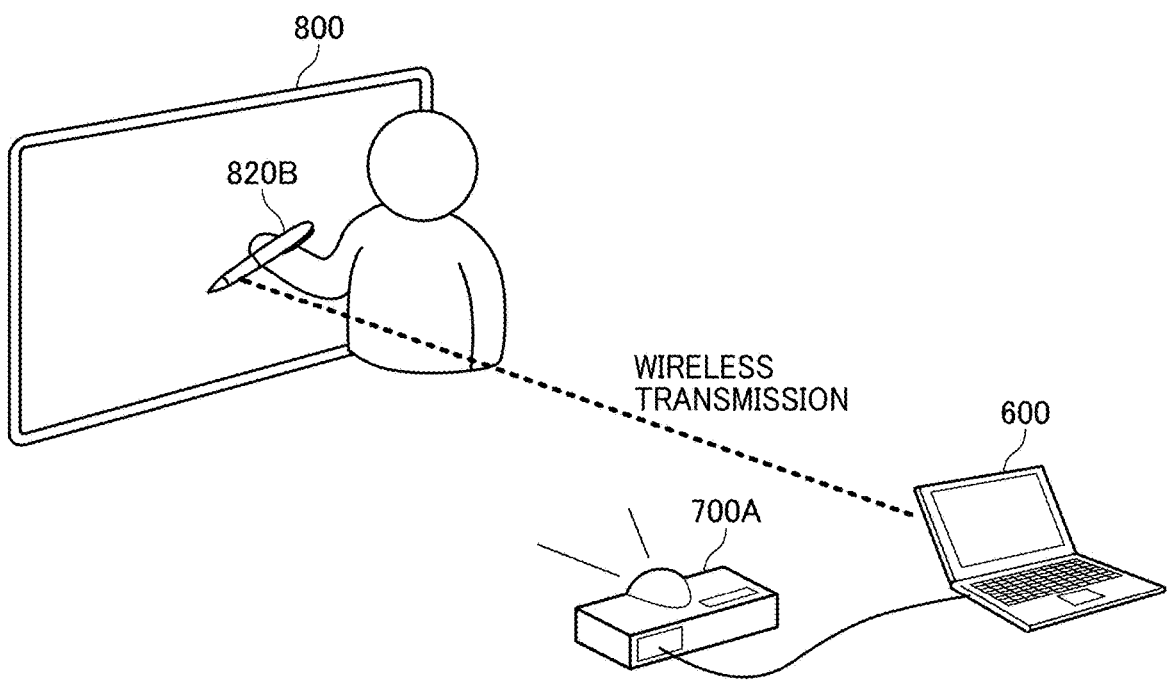
FIG. 45 is a diagram illustrating a configuration of a display apparatus according to another embodiment.

FIG. 45 is a diagram illustrating another example of the configuration of the display system. In the example illustrated FIG. 45, the display system includes the terminal 600 and the image projector 700A.

The terminal 600 communicates with an electronic pen 820B through by wireless communication such as BLUETOOTH, to receive coordinate information indicating a position pointed by the electronic pen 820B on the screen 800. The electronic pen 820B may read minute position information on the screen 800, or receive the coordinate information from the screen 800.

Based on the received coordinate information, the terminal 600 generates image data of handwritten data input by the electronic pen 820B, and causes the image projector 700A to project an image based on the handwritten data.

The terminal 600 generates data of a superimposed image in which an image based on handwritten data input by the electronic pen 820B is superimposed on the background image projected by the image projector 700A.

The embodiments described above are applied to various system configurations.

The present disclosure is not limited to the details of the embodiments described above, and various modifications and improvements are possible. For example, elements and/or features of different illustrative embodiments may be combined with each other and/or substituted for each other within the scope of the present invention.

For example, in the embodiment described above, editing related to rows has been mainly described, but the user can edit columns in the same manner. For the columns, the title column is at the left end.

Although the input of handwritten data has been mainly described in the embodiment described above, the display apparatus performs character recognition of handwritten data. The drawing object in the table may be handwritten data or a character string.

In the above-described embodiment, the description concerns the display device to be used as an electronic whiteboard. However, the display device may be any display apparatus, for example, a digital signage, which displays an image. Instead of the display apparatus, a projector may perform displaying. In this case, the display apparatus 2 may detect the coordinates of the tip of the pen using ultrasonic waves, although the coordinates of the tip of the pen are detected using the touch panel in the above-described embodiment. The pen emits an ultrasonic wave in addition to the light, and the display apparatus 2 calculates a distance based on an arrival time of the sound wave. The display apparatus 2 determines the position of the pen based on the direction and the distance. The projector draws (projects) the trajectory of the pen as a stroke.

In alternative to the electronic whiteboard described above, the present disclosure is applicable to any information processing apparatus with a touch panel. An apparatus having capabilities similar to that of an electronic whiteboard is also called an electronic information board or an interactive board. Examples of the information processing apparatus with a touch panel include, but not limited to, a projector (PJ), a data output device such as a digital signage, a head up display (HUD), an industrial machine, an imaging device such as a digital camera, a sound collecting device, a medical device, a network home appliance, a laptop computer, a mobile phone, a smartphone, a tablet terminal, a game console, a personal digital assistant (PDA), a wearable PC, and a desktop PC.

In the block diagram such as FIG. 5, functional units are divided into blocks in accordance with main functions of the display apparatus 2, in order to facilitate understanding the operation by the display apparatus 2. Each processing unit or each specific name of the processing unit is not to limit a scope of the present disclosure. A process implemented by the display apparatus 2 may be divided into a larger number of processing units depending on the content of the processing. In addition, a single processing unit can be further divided into a plurality of processing units.

Although characteristic functions of the above-described embodiment are provided by the display apparatus 2 alone in the description above, a server may provide at least a portion of the functions of the display apparatus 2. In this case, the display apparatus 2 and the server communicate with each other via a network. The display apparatus 2 displays the handwriting data and transmits the handwriting data to the server, and the server provides a character recognition function and a table function. The server implements the functional units in FIG. 5 other than the contact position detection unit 40 and the display control unit 45.

Further, in the present embodiment, even if a threshold value is exemplified as a comparison, the threshold value is not limited to the exemplified value. For this reason, in the present embodiment, regarding all of the threshold values, expressions "less than the threshold value" and "equal to or less than the threshold value" have an equivalent meaning, and expressions "greater than the threshold value" and "equal to or more than the threshold value" have an equivalent meaning. For example, the expression "less than the threshold value" when the threshold value is 11" has the same meaning as "less than or equal to the threshold value when the threshold value is 10." In addition, the expression "exceeding the threshold value" when the threshold value is 10 has the same meaning as the expression "equal to or greater than the threshold value" when the threshold value is 11.

Each of the functions of the described embodiments may be implemented by one or more processing circuits or circuitry. Here, the "processing circuit or circuitry" in the present specification includes a programmed processor to execute each function by software, such as a processor implemented by an electronic circuit, and devices, such as an application specific integrated circuit (ASIC), a digital signal processors (DSP), a field programmable gate array (FPGA), and conventional circuit modules designed to perform the recited functions.

The contact position detection unit 40 is an example of a receiving unit. The object selection unit 44 is an example of a selection receiving unit. The table object management unit 43 is an example of a control unit. The symbol recognition unit 48 is an example of a recognition unit.

Any one of the above-described operations may be performed in various other ways, for example, in an order different from the one described above.

The present disclosure provides significant improvements in computer capabilities and functionalities. These improvements allow a user to utilize a computer which provides for more efficient and robust interaction with a table which is a way to store and present information in an information processing apparatus. Moreover, the present disclosure provides for a better user experience through the use of a more efficient, powerful and robust user interface. Such a user interface provides for a better interaction between a human and a machine.

The invention claimed is:

1. A display apparatus comprising circuitry configured to:
    display, on a screen, a table including one or more table elements, the table element being a row or a column of the table;
    receive handwritten data input on the screen; and
    select, based on the handwritten data, at least one table element of the table,
    wherein the circuitry edits the selected table element in accordance with a user operation,
    wherein, in a case where the selected table element is a row of the table being a first table and the circuitry receives, as the user operation, drag-and-drop of the selected row to an outside of the first table, the circuitry;
    generates a second table in which a title row of the first table is inherited to the selected row, and
    in the first table, deletes the selected row and move up each row below the selected row by one; and
    wherein, in a case where the selected table element is a column of the first table and the circuitry receives drag-and-drop of the selected column to the outside of the first table, the circuitry;
    generates a second table in which a title column of the first table is inherited to the selected column, and
    in the first table, deletes the selected column and move each column on the right of the selected column to the left by one.

2. The display apparatus according to claim 1, wherein the handwritten data is one or more strokes enclosing the selected table element.

3. The display apparatus according to claim 1, wherein the handwritten data is one or more strokes within a distance from the table element and represents a selecting symbol instructing to select the table element.

4. The display apparatus according to claim 1, wherein the circuitry further:
    displays a graphical representation for adding a table element adjacent to the selected table element; and
    adds a table element before or after the selected table element in response to receiving selection of the graphical representation.

5. The display apparatus according to claim 1, wherein the circuitry:
    receives another handwritten data;
    determines whether the another handwritten data includes an adding symbol adjacent to the selected table element, the adding symbol instructing to add a table element; and
    adds a table element before or after the selected table element based on a determination that the another handwritten data includes the adding symbol.

6. The display apparatus according to claim 1, wherein the circuitry:
    receives another handwritten data;
    determines whether the another handwritten data includes an adding symbol at a boundary of the selected table element, the adding symbol instructing to add a table element; and
    adds a table element before or after the selected table element based on a determination that the another handwritten data includes the adding symbol.

7. The display apparatus according to claim 1, wherein the circuitry:
    displays a graphical representation for deleting the selected table element; and
    deletes the selected table element in response to receiving selection of the graphical representation.

8. The display apparatus according to claim 1, wherein the circuitry:
    receives another handwritten data;

determines whether the another handwritten data includes a deleting symbol adjacent to the selected table element, the deleting symbol instructing to delete the table element; and deletes the selected table element based on a determination that the another handwritten data includes the deleting symbol.

9. The display apparatus according to claim 1, wherein the circuitry:

receives another handwritten data;

determines that the another handwritten data instructs deletion based on a determination that the another handwritten data has:

a start point within a distance from one of two diagonal corners of the selected table element, and an end point within the distance from the other of the two diagonal corners of the selected table element; and deletes the selected table element based on the determination that the another handwritten data instructs deletion.

10. The display apparatus according to claim 1, wherein, in a case where the selected table element is a row and the circuitry receives, as the user operation, dragging the selected row to a different row of the table, the circuitry:

moves the selected row to the different row; and moves down each row below the different row by one or moves up each row above the different row by one; and wherein, in a case where the user operation indicates selecting a column of the table and dragging the selected column to a different column of the table, the circuitry:

moves the selected column to the different column; and moves each column on the right of the different column to the right by one or moves each column on the left of the different column to the left by one.

11. The display apparatus according to claim 1, wherein, in a case where the selected table element is a row and the circuitry receives, as the user operation, input of another handwritten data having a start point in the selected row and an end point in a different row of the table, the circuitry:

moves the selected row to the different row, and moves down each row below the different row by one or moves up each row above the different row by one; and wherein, in a case where the selected table element is a column and the circuitry receives, as the user operation, input of another handwritten data having a start point in the selected column and an end point in a different column of the table, the circuitry:

moves the selected column to the different column, and moves each column on the right of the different column to the right by one or moves each column on the left of the different column to the left by one.

12. The display apparatus according to claim 1, wherein, in a case where the selected table element is a row and the circuitry receives, as the user operation, input of another handwritten data having a start point within a distance from the selected row and an end point within the distance from a different row of the table, the circuitry:

moves the selected row to the different row, and moves down each row below the different row by one or moves up each row above the different row by one; and wherein, in a case where the selected table element is a column and the circuitry receives, as the user operation, input of another handwritten data having a start point within a distance from the selected column and an end point within the distance from a different column of the table, the circuitry:

moves the selected column to the different column, and moves each column on the right of the different column to the right by one or moves each column on the left of the different column to the left by one.

13. A display apparatus comprising circuitry configured to:

display, on a screen, a table including one or more table elements, the table element being a row or a column of the table;

receive handwritten data input on the screen; and select, based on the handwritten data, at least one table element of the table, wherein the circuitry edits the selected table element in accordance with a user operation, and wherein, in a case where the selected table element is a row of the table being a first table and the circuitry receives drag of the selected row to an outside of the first table, the circuitry displays a preview image of a second table, the second table in which a title row of the first table is inherited to the selected row.

14. A method for displaying on a screen, the method comprising:

displaying, on a screen, a table including one or more table elements, the table element being a row or a column of the table;

receiving handwritten data input on the screen; and selecting, based on the handwritten data, at least one table element of the table, the method further comprising editing the selected table element in accordance with a user operation, wherein, in a case where the selected table element is a row of the table being a first table and the receiving receives, as the user operation, drag-and-drop of the selected row to an outside of the first table, the method further performs:

generating a second table in which a title row of the first table is inherited to the selected row, and in the first table, deleting the selected row and move up each row below the selected row by one; and wherein, in a case where the selected table element is a column of the first table and the receiving receives drag-and-drop of the selected column to the outside of the first table, the method further comprises:

generating a second table in which a title column of the first table is inherited to the selected column, and in the first table, deleting the selected column and move each column on the right of the selected column to the left by one.

\* \* \* \* \*